(12) United States Patent
Miele et al.

(10) Patent No.: US 10,412,560 B2
(45) Date of Patent: Sep. 10, 2019

(54) MOBILE DEVICE COOLING AND PERFORMANCE MANAGEMENT

(71) Applicants: Ralph V. Miele, Hillsboro, OR (US); Eduardo Escamilla, Round Rock, TX (US); James Utz, Austin, TX (US); James M. Yoder, Beaverton, OR (US); Tongyan Zhai, Buffalo Grove, IL (US); Baomin Liu, Austin, TX (US); Meenakshi Gupta, Portland, OR (US); Brian R Peil, Portland, OR (US); Venkat R Gaurav, Beaverton, OR (US); Drew G Damm, Hillsboro, OR (US); Andrew Larson, Hillsboro, OR (US); Ricky O Branner, Sherwood, OR (US)

(72) Inventors: Ralph V. Miele, Hillsboro, OR (US); Eduardo Escamilla, Round Rock, TX (US); James Utz, Austin, TX (US); James M. Yoder, Beaverton, OR (US); Tongyan Zhai, Buffalo Grove, IL (US); Baomin Liu, Austin, TX (US); Meenakshi Gupta, Portland, OR (US); Brian R Peil, Portland, OR (US); Venkat R Gaurav, Beaverton, OR (US); Drew G Damm, Hillsboro, OR (US); Andrew Larson, Hillsboro, OR (US); Ricky O Branner, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/280,986

(22) Filed: Sep. 29, 2016

(65) Prior Publication Data

US 2018/0091987 A1    Mar. 29, 2018

(51) Int. Cl.
   *H04W 24/02*  (2009.01)
   *H04W 4/50*  (2018.01)
   *G06F 1/16*  (2006.01)

(52) U.S. Cl.
   CPC ............ *H04W 4/50* (2018.02); *G06F 1/1613* (2013.01)

(58) Field of Classification Search
   CPC .............................. H04W 24/02; H04W 4/001
   See application file for complete search history.

(56) References Cited

U.S. PATENT DOCUMENTS

2010/0235560 A1    9/2010  Oh et al.
2014/0098486 A1    4/2014  Davis
(Continued)

FOREIGN PATENT DOCUMENTS

WO    WO-2016105813 A1    6/2016

OTHER PUBLICATIONS

"International Application Serial No. PCT/US2017/049368, International Search Report dated Dec. 8, 2017", 7 pgs.
(Continued)

*Primary Examiner* — Chuong A Ngo
(74) *Attorney, Agent, or Firm* — Schwegman Lundberg & Woessner, P.A.

(57) ABSTRACT

Disclosed is a mobile device. The mobile device may be located proximate a mobile terminal and controlled by the mobile terminal. The mobile device may include a processor and a memory. The memory may store instructions that, when executed by the processor, cause the processor to: determine a mode of operation of the mobile device, determine a thermal profile for the mode of operation of the mobile device, and implement a power profile to achieve the thermal profile.

25 Claims, 22 Drawing Sheets

(56) References Cited

U.S. PATENT DOCUMENTS

| | | | |
|---|---|---|---|
| 2014/0249690 A1* | 9/2014 | Park | G06F 1/206 700/300 |
| 2014/0266780 A1 | 9/2014 | Rahman et al. | |
| 2014/0368989 A1* | 12/2014 | Lozano | G06F 1/1632 361/679.41 |
| 2015/0088333 A1* | 3/2015 | Delano | G05D 23/19 700/300 |
| 2017/0164220 A1* | 6/2017 | Roessel | H04M 3/42 |

OTHER PUBLICATIONS

"International Application Serial No. PCT/US2017/049368, Written Opinion dated Dec. 8, 2017", 7 pgs.

* cited by examiner

MOBILE DEVICE COOLING AND PERFORMANCE MANAGEMENT

TECHNICAL FIELD

Embodiments described generally herein relate to mobile devices. Some embodiments relate to managing performance of a mobile device to and mobile device cooling using mobile terminals.

BACKGROUND

A mobile device is a class of mobile computing devices that include features of a smartphone and a tablet. Typically, a mobile device may have a diagonal display that measures between 5.1 and 6.99 inches. Mobile devices may also include touch screen displays that allow for mobile web browsing and viewing multimedia content.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
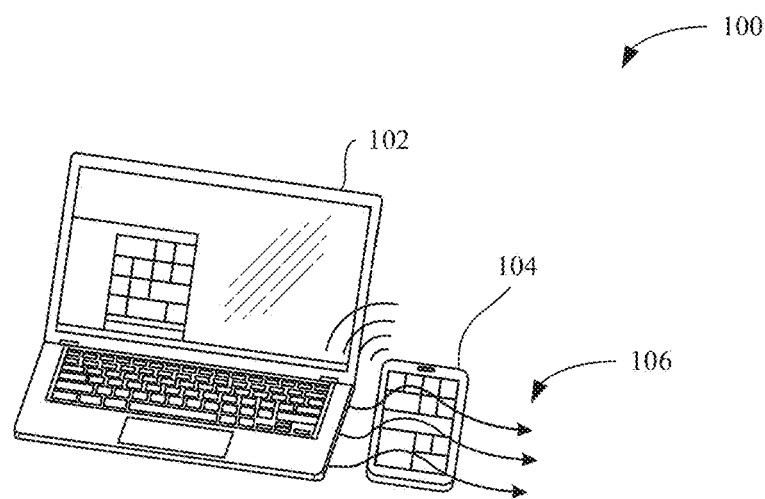
FIG. 1 illustrates an operating environment in accordance with some embodiments.

Mobile devices may provide a personal computer (PC) in-your-pocket mobile compute experience. When paired with a mobile device, a mobile input output (IO) terminal may enhance the mobile device user experience by providing a full size keyboard and screen for on-the-go mobile productivity while using the compute power from the mobile device. Thermal limitations of a mobile device form factor may inhibit performance and prevent a full notebook PC like experience. However, when a mobile device is paired with a mobile IO terminal as disclosed herein, the performance and experience may change to align with the notebook PC form factor and overcome the thermal limitations. As disclosed herein, a mobile device may be defined as a mobile phone, a tablet, a phablet, a laptop, or other mobile device needing improved performance while docked with a device.

As disclosed herein, adaptive performance methodologies may allow mobile devices to perform at laptop levels when cooled properly. By pairing a mobile IO terminal with a mobile device, the mobile IO terminal may enhance the performance of the mobile device by supplying supplemental cooling. The supplemental cooling may allow the mobile device to drive the mobile IO terminal to full notebook PC performance levels.

The mobile IO terminal may include a communications connection along with enhanced cooling capability for the mobile device. As disclosed herein, there are multiple methods for providing mobile device cooling when couple with the mobile IO terminal. The mobile device coupling by the mobile IO terminal may provide a user a way to expand a traditional mobile device experience to a notebook clamshell type experience with additional performance gains.

The supplemental cooling may be provide in a variety of manners. For example, the mobile IO terminal may include additional fans, heat sinks, etc. that may be used to cool a mobile device. The mobile IO terminal, or the mobile device, may include a memory that stores a plurality of thermal profiles. Each of the plurality of thermal profiles may correspond to a power profile of the mobile device. Depending on the operating mode of the mobile device the mobile IO terminal may transmit the power profile to the mobile device, or vice versa. The thermal status of the mobile device may be monitored and the power consumption of the mobile device may be adjusted such that the thermal status remains within the thermal profile.

In addition, a docking station may include an extraction assembly that may be used to deploy a heat exchanger contained within a mobile device. The heat exchanger may be positioned within the docking station such that air may be passed over the heat exchanger to extract heat from the mobile device.

As disclosed herein, a mobile device may monitor its thermal environment via strategically placed thermal sensors within the mobile device. When the mobile device is operated in a handheld mode, the mobile device may scale down the system on a chip (SOC) power to give optimum performance for handheld usages. Stated another way, the mobile device may scale down SOC power to have lower skin temperatures and prolonged battery life. For productivity usages, the mobile device may be attached to a mobile IO terminal to provide active cooling. The software architecture of the mobile device may communicate the increased cooling to generate a trigger event to the mobile device's firmware. The firmware may communicate an event to the basic input/output system (BIOS) of the mobile device. The BIOS may propagate the event to the operating system (OS) of the mobile device.

The mobile device may establish a connection with the active cooling device (i.e., the mobile IO terminal), via the communication interface. After the connection is established, the mobile device's performance may be scaled up in anticipation of an increased thermal envelope. The mobile device may monitor the skin temperature and SOC temperature on the mobile device and may control the active cooling device as needed for an optimum balance between performance and acoustics. When the mobile device is disconnected from the mobile IO terminal an undocking event may occur. Upon the undocking event occurring, the mobile device's performance may be scaled down, reverting to handheld mode and disconnected from the active cooling supplied by the mobile IO terminal.

Turning now to the figures, FIG. 1 illustrates an operating environment 100 in accordance with some embodiments. The operating environment 100 may include a mobile IO terminal 102 and a mobile device 104. During operation, the mobile device 104 and the mobile IO terminal 102 may be paired. The pairing of the mobile device 104 and the mobile IO terminal 102 may be via wireless technologies such as, but not limited to, near field communication (NFC), Bluetooth, WiFi, etc. and wired technologies such as, but not limited to, universal serial bus (USB), Ethernet, etc.

As disclosed herein, upon pairing of the mobile IO terminal 102 and the mobile device 104, the performance of the mobile device 104 may be increased. For example, during handheld operations the mobile device 104 may operate at 3.5 W performance. The lower performance may help to ensure that the skin temperature of the mobile device 104 remains below a certain level. Stated another way, the lower performance may be needed to keep the skin temperature of the mobile device 104 at a comfortable level to a user. However, once paired with the mobile IO terminal 102, a position of the mobile device 104 may be determined and the performance increased. For example, the mobile device 104, the mobile IO terminal 102, or both, may determine a position of the mobile device 104 and adjust the performance of the mobile device 104 accordingly. For instance, as shown in FIG. 1, the mobile device 104 may be located proximate the mobile IO terminal 102, such as for example, on the surface of a desk.

Because the mobile device 104 is not being used as a handheld device when paired with the mobile IO terminal 102, the mobile device 104 may be operated at a higher power, such as for example, 7.0 W. The additional heat generated by the mobile device 104 operating at a high power may cause temperatures associated with the mobile device 104 to rise. For instance, while operating at a high power consumption level, the temperature of interior components such as, for example, memory and a central processing unit (CPU) as well as exterior components such as, for example, the surfaces of the mobile device 104 may increase.

To dissipate the additional heat, the mobile device 104 may receive additional cooling capacity from the mobile IO terminal 102. For example, and as shown in FIG. 1, the mobile device 104 may be located proximate the mobile IO terminal 102 and a fan or other air mover controlled by the mobile IO terminal 102 may generate an airflow 106. The airflow 106 may be directed towards the mobile device 104. As a result, the mobile IO terminal 102 may provide convective cooling to the mobile device 104 and thus, allow the mobile device 104 to operate with greater performance.

Figure 2D:
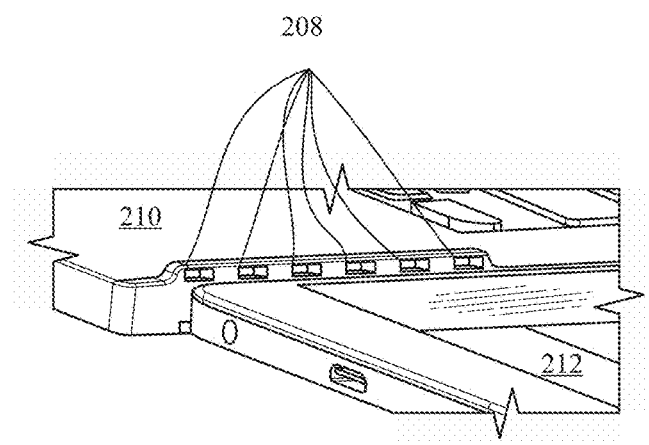
FIGS. 2A-2E illustrate a mobile input output (IO) terminal and a mobile device in accordance with some embodiments.
Figure 2A:
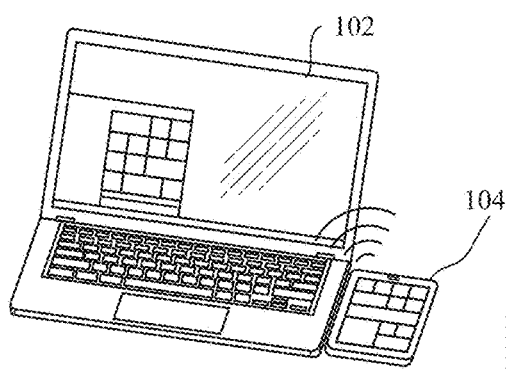
Figure 3:
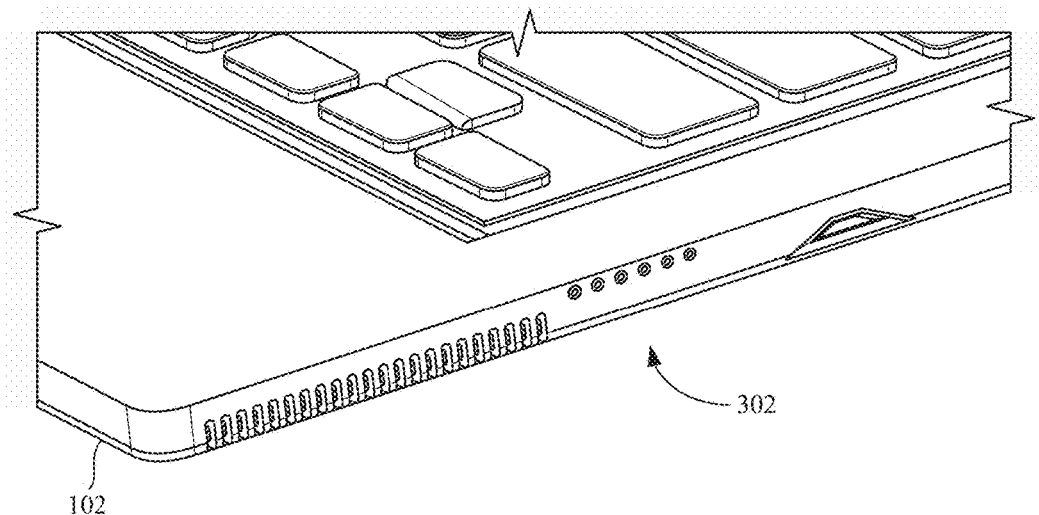
FIG. 3 illustrates a mobile IO terminal in accordance with some embodiments.

As disclosed herein, multiple configurations may be used to pair the mobile IO terminal 102 and the mobile device 104 in order to provide mobile device cooling and thus increased mobile device performance. As shown in FIG. 2A, the mobile device 104 may be located adjacent to the mobile IO terminal 102. The mobile device 104 may be spaced from the mobile IO terminal 102 (FIG. 1) or in direct contact with the mobile IO terminal 102 (FIG. 2A). The mobile device 104 may be held in direct contact with the mobile IO terminal 102 using magnets 302 (see FIG. 3) or other connectors as disclosed herein. The magnets 302 may act as electrical connections that allow signals to pass between the mobile IO terminal 102 and the mobile device 104. In addition, the magnets 302 may allow the mobile IO terminal 102 to charge or otherwise power the mobile device 104.

Figure 2B:
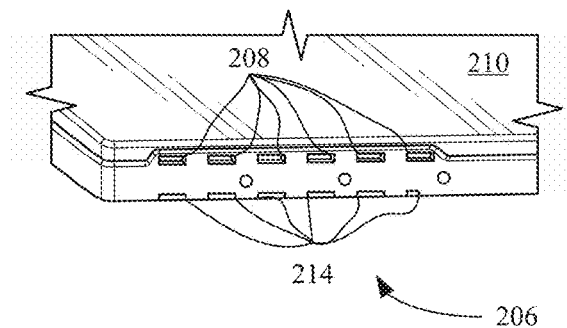
Figure 2C:
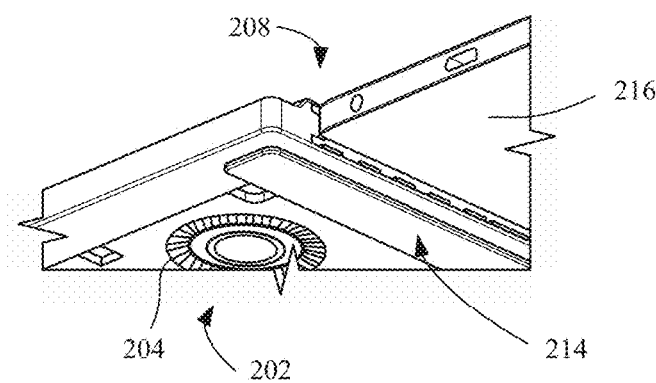
Figure 2E:
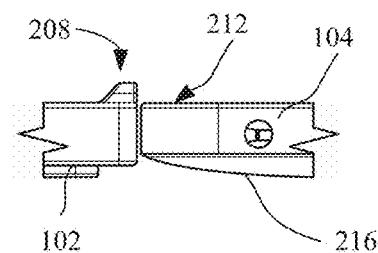

As shown in FIG. 2C, the mobile IO terminal 102 may include a fan 202. The shell of the mobile IO terminal 102 may define an inlet 204 and an exhaust 206 (FIG. 2B). Referring to FIG. 2B, the exhaust 206 may include a first plurality of openings 208 that may be raised slightly above a surface 210 of the mobile IO terminal 102. The first plurality of openings 208 may allow the fan 202 to blow air across a surface 212, such as a screen, of the mobile device 104 (as shown in FIG. 2E). In addition, as shown in FIG. 2B, the exhaust 206 may include a second plurality of openings 214. The second plurality of openings 214 may allow the fan 202 to blow air across the underside 216 of the mobile device 104 as shown in FIG. 2E. As shown in FIG. 2E, the underside 216 of the mobile device 104 may have a curved profile. The curved profile may elevate the mobile device 104 to allow the air to flow underneath the mobile device 104. In addition, the curved profile of the underside 216 may increase the surface area and thus increase heat transfer rates to provide additional cooling capacity.

The volume of air moved by the fan 202 may vary depending on the application. For example, for computationally intensive usage, the fan 202 may deliver airflow of about 3 cubic feet per minute (CFM). For less computationally intensive usage, the fan 202 may deliver airflow of about 0.5 CFM. In addition, the volume of air delivered does not have to be constant and may vary during usage. For instance, when a rise in temperature, either an internal component or a skin temperature, is detected by the mobile device 104, the mobile device 104 may transmit a signal to the mobile IO terminal 102 to increase the volumetric flow rate of the air. As the temperature decreases the volumetric flow rate of the air may be decreased to conserve energy and for quieter operations. The fan 202 and associated ducts within the mobile IO terminal 102 may be dedicated systems for the mobile device 104. In other words, the fan 202 and associated ducts may be used solely to cool the mobile device 104 and not components of the mobile IO terminal 102.

Figure 4:
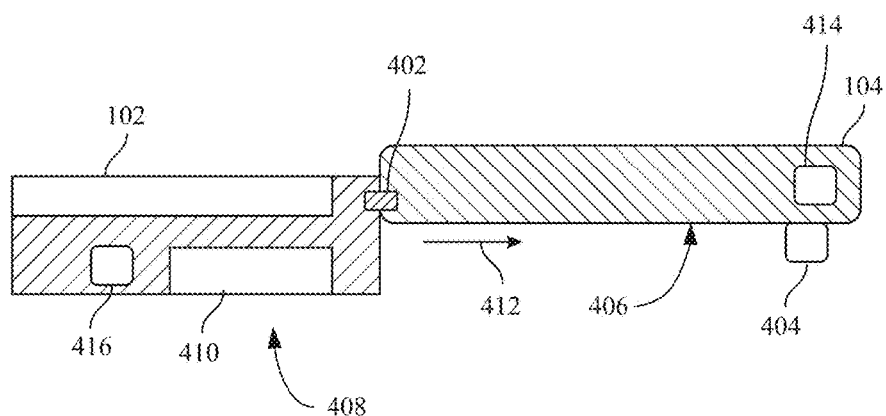
FIG. 4 illustrates a mobile IO terminal and a mobile device in accordance with some embodiments.

The mobile device 104 may be physically attached to the mobile IO terminal 102. As shown in FIG. 4, a connector 402 may provide a physical connection that may anchor the mobile device 104 to the mobile IO terminal 102. The mobile device 104 may also include a foot 404. The foot 404 may elevate a lower surface 406 of the mobile device 104. During operation, the fan 408 may draw air through an inlet 410 and direct the air, as indicated by arrow 412, beneath the mobile device 104. The foot 404 may be a component of the mobile device 104 or a portion of the mobile IO terminal 102. For example, the foot 404 may fit within a compartment 414 of the mobile device 104 or a compartment 416 of the mobile IO terminal 102. To deploy the foot 404, a user may remove the foot 404 from the mobile device 104 or the mobile IO terminal 102 and place the foot 404 on a work surface or otherwise connect the foot 404 to the mobile device 104.

The connector 402 may also be housed within the mobile device 104 or the mobile IO terminal 102 when not in use. The connector 402 may also provide an electrical connection between the mobile device 104 and the mobile IO terminal 102. For example, the connector 402 may allow the mobile IO terminal 102 and the mobile device 104 to exchange electrical signals or otherwise allow the mobile IO terminal 102 to charge the mobile device 104.

In addition to the fan 408 providing airflow, heat generated by the mobile device 104 may also cause a natural convective stream. For instance, during operation the mobile device 104 may generate heat which may then be conducted into air surrounding the mobile device 104. As air surrounding the mobile device 104 heats up a convective current may develop due to changes in the density of the air surrounding the mobile device 104.

Figure 5A:
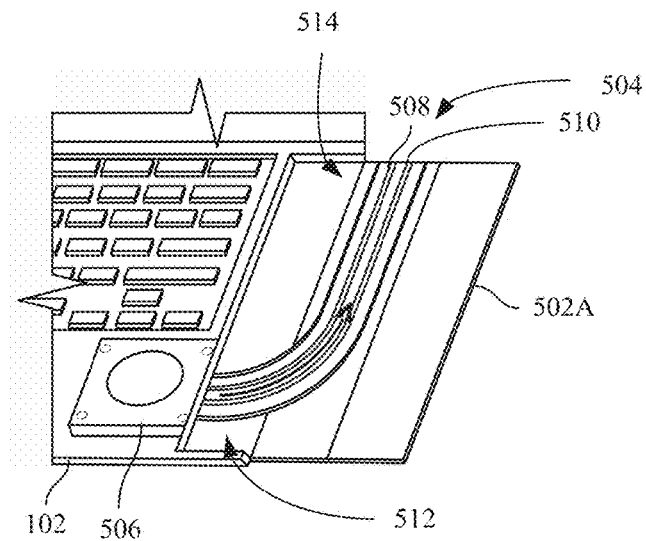
FIGS. 5A-5C illustrate a mobile IO terminal in accordance with some embodiments.
Figure 5B:
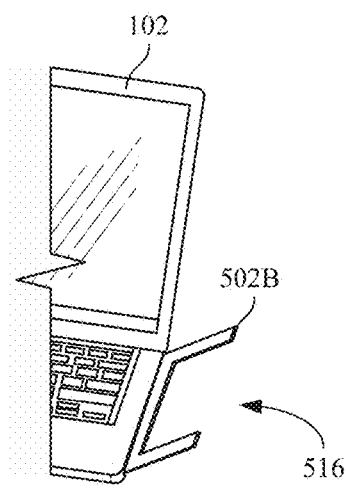
Figure 5C:
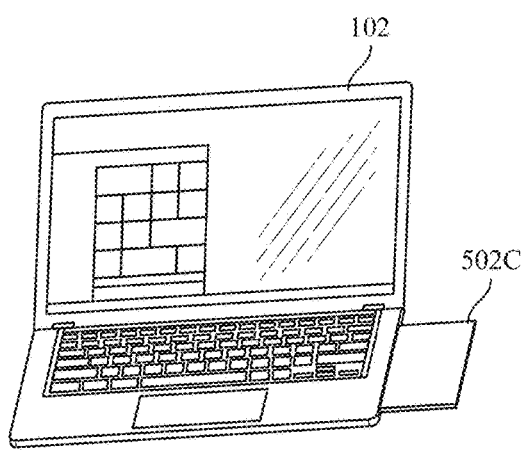

As shown in FIGS. 5A-5C, the mobile IO terminal 102 may include an integrated stand 502A, 502B, and 502C (collectively, integrated stands 502). The integrated stands 502 may provide a dual screen experience with both screens from the mobile IO terminal 102 and the mobile device 104 presented to a user. The chassis of the mobile IO terminal 102 may provide a highly conductive surface (e.g., copper, graphite, etc.) area for the heat from the mobile device 104 to spread. In addition, the mobile device 104 may get supplemental power from the mobile IO terminal 102 to support the higher performance enabled by the cooling provided by the mobile IO terminal 102.

The integrated stands 502 may have differing configurations. The integrated stand 502C (as shown in FIG. 5C) may be a solid member that extends from the mobile IO terminal 102. As illustrated in FIG. 5A, the integrated stand 502A illustrates grooves or channels 504 that may be used to direct airflow from a fan 506 around the mobile device 104. The channels 504 may include varying cross sectional areas. For example, a first channel 508 may have a cross sectional area that differs from a cross sectional area of a second channel 510. In addition, the cross sectional area of a channel may vary along the length of the channel. For instance, a first portion 512 of the first channel 508 proximate the fan 506 may have a larger or smaller cross sectional area than a second portion 514 of the first channel 508.

The integrated stand 502B defines a notched portion 516. The notched portion 516 may allow the mobile device 104 to rest upon the integrated stand 502B, yet remain elevated above a surface. By elevating the mobile device 104, convection, natural or forced, may be utilized to assist in cooling the mobile device 104. Just as with the integrated stand 502A, the integrated stand 502B may include grooves or channels (not shown in FIG. 5B) that may be used to direct airflow around the mobile device 104.

The integrated stands 502 may be stored within the mobile IO terminal 102. For example, the integrated stands 502 may extend from and retract into a cavity defined by the mobile IO terminal 102. The stand may eject via an electro mechanical switch, a mechanical latch or push-push mechanism. In addition, the integrated stands 502 may be separate entities that attach to the mobile IO terminal 102. Attaching of the integrated stands 502 to or extending the integrated stands 502 from the mobile IO terminal 102 may be used to pair the mobile IO terminal 102 to the mobile device 104. For example, extension of the integrated stands 502 may activate a near field communication (NFC) module within the mobile IO terminal 102 to search for the mobile device 104.

The integrated stands 502 may be manufactured using a variety of materials and manufacturing methods. For example, the integrated stands 502 may be manufactured from a metallic material to improve heat transfer from the mobile device 104 to the integrated stands 502. In addition, the integrated stands 502 may be manufactured from a polymer material and coated with a metallic material. Methods such as machining via computer numerically controlled (CNC) machine may be used to manufacture the integrated stands 502 from a billet material. In addition, the integrated stands 502 may be injection molded.

Figure 6A:
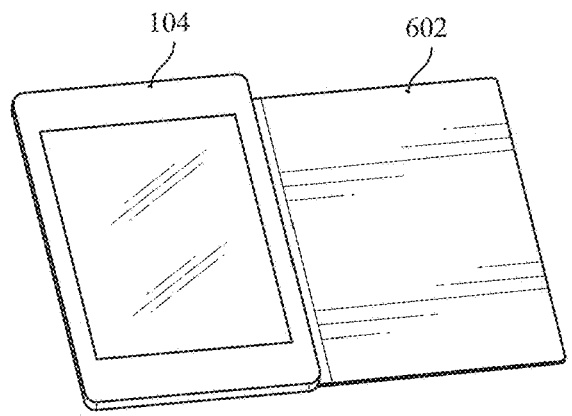
FIGS. 6A and 6B illustrate a mobile IO terminal and a mobile device with a folio in accordance with some embodiments.
Figure 6B:
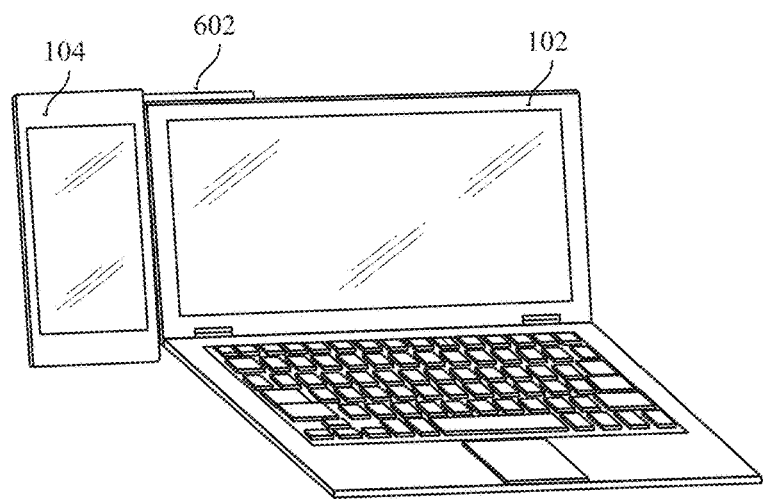

FIG. 6A shows the mobile device 104 including a folio 602. The folio 602 may include a cosmetic skin such as leather or a decorative polymer. The inside of the folio 602 may be constructed from a conductive material such as, for example, graphite or a metallic material. In addition, metal plates and magnets (not shown) may be sewn into the folio 602 for structure and attachment to the mobile IO terminal 102. For example, as shown in FIG. 6B, the folio 602 may be attached to a back surface of a clamshell display of the mobile IO terminal 102. The chassis of the mobile IO terminal 102 may provide added surface area for the heat from the mobile device 104 to spread and dissipate. Use of the folio 602 may be a fanless cooling method. Stated another way, conduction between the folio 602 and the clamshell of the mobile IO terminal 102 may extract heat generated by the mobile device 104. In addition to conduction, the heated surface may cause the air proximate the mobile device 104, the folio 602 and the mobile IO terminal 102 to rise creating a free convection cooling effect. Also as disclosed herein, the folio 602 may include electrical connections that may allow the mobile device 104 to receive supplemental power from the mobile IO terminal 102 to support the higher performance enabled by the cooling.

Figures 7A, 7B:
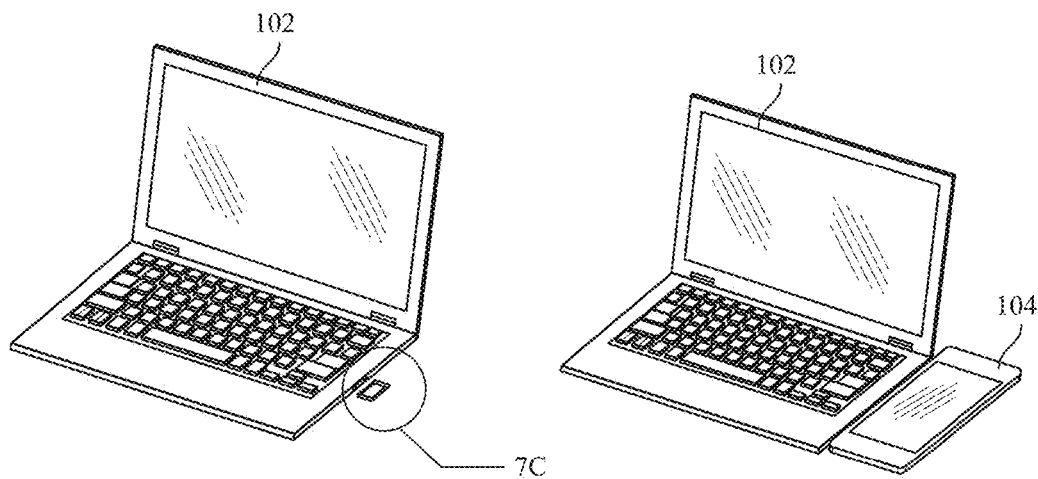
FIGS. 7A-7C illustrate a mobile IO terminal and a mobile device in accordance with some embodiments.
Figure 7C:
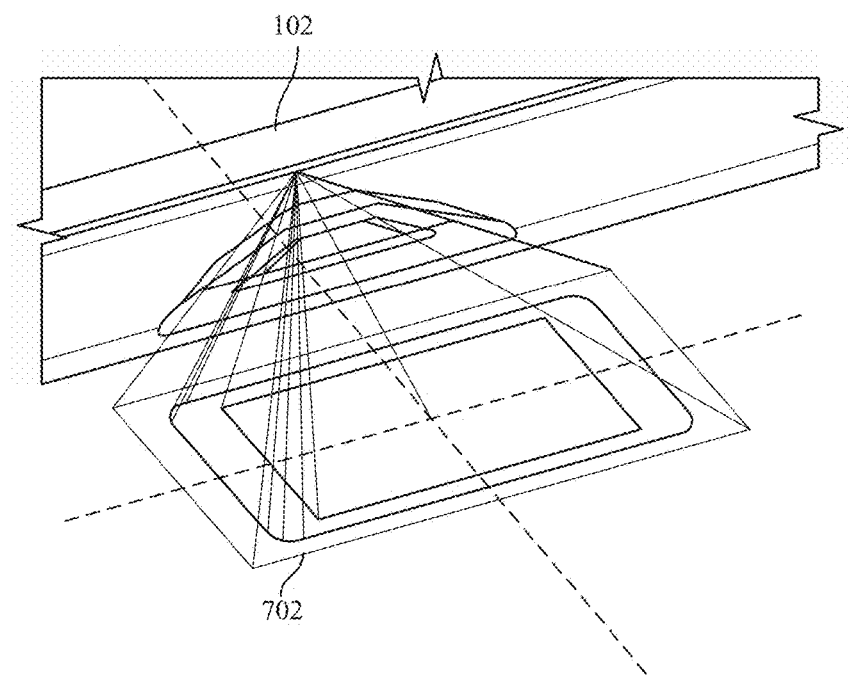

In addition to mechanical methods, optical methods may be used to assist in positioning the mobile device 104. As shown in FIGS. 7A-7C, the mobile IO terminal 102 may project an indicia 702. The indicia 702 may alert a user of a proper placement of the mobile device 104 in relation to the mobile IO terminal 102 for enhanced cooling and performance. For example, as shown in FIGS. 7A and 7C, the mobile IO terminal 102 may display an outline or other markings on a work surface. The outline or other markings may advise the user of the location for the mobile device 104 that may allow the mobile IO terminal 102 to provide optimal cooling.

The projection of the indicia 702 may be prompted by the mobile IO terminal 102 detecting the mobile device 104 or the mobile device 104 transmitting a signal to the mobile IO terminal 102. For example, upon placing the mobile device 104 proximate the mobile IO terminal 102, the mobile IO terminal 102 may detect the mobile device 104 and activate a light emitting diode (LED) that may cause the indicia 702 to be displayed.

The size and location of the indicia 702 may vary. For example, different mobile devices may be connected with the mobile IO terminal 102. Each of the different mobile devices may have different physical and operating characteristics. For instance, each of the mobile devices may have differing levels of computing power, be manufactured of different shell materials (metal vs. polymers), have different physical dimensions, etc. As a result, the mobile IO terminal 102 may project a different indicia for the different mobile devices upon detection. The characteristics of the mobile devices may be transmitted to the mobile IO terminal 102 from the mobile devices or be stored in a memory of the mobile IO terminal 102.

Figure 8:
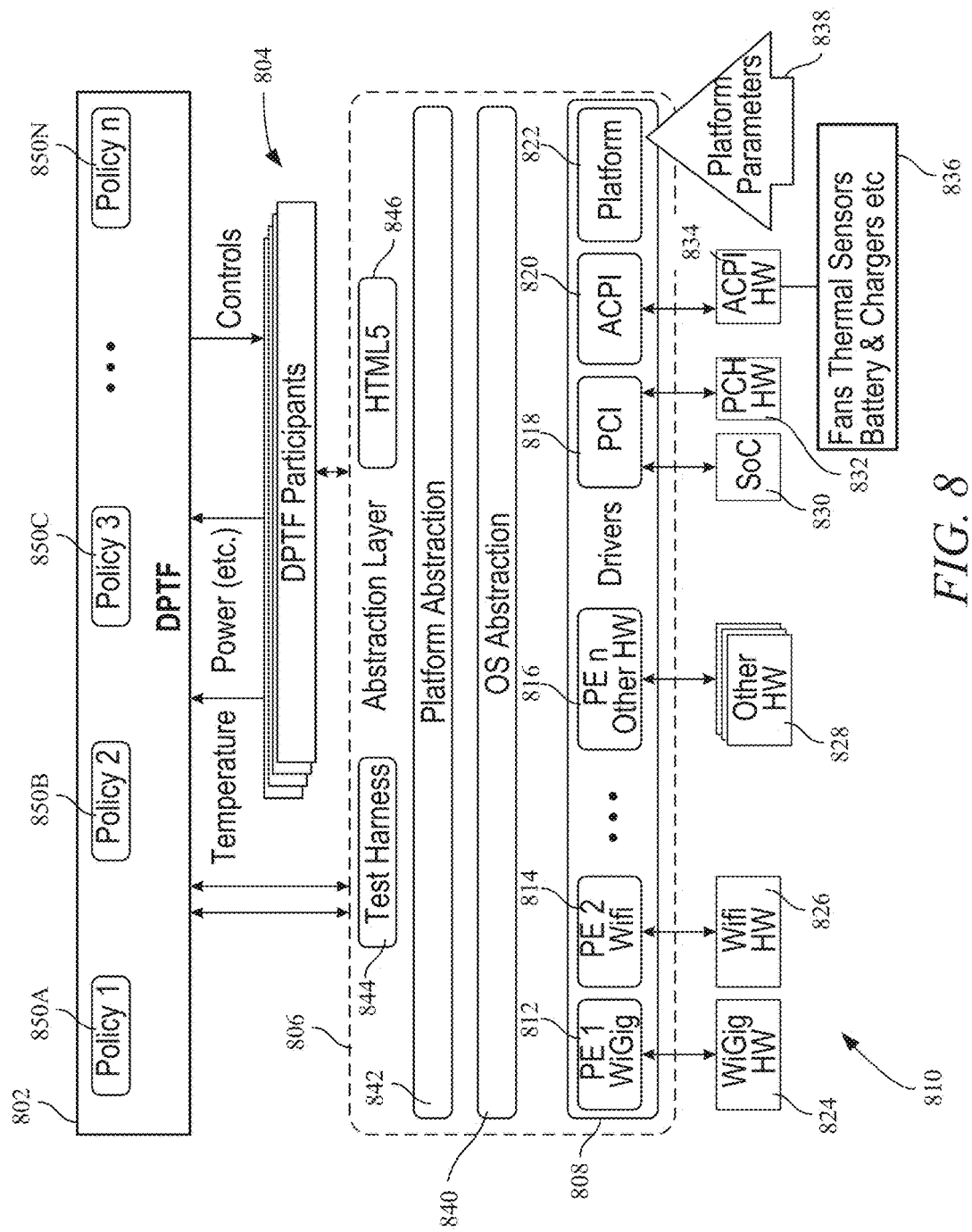
FIG. 8 illustrates a schematic of a mobile device in accordance with some embodiments.

FIG. 8 illustrates an example software stack of the mobile device 104. As shown in FIG. 8, the mobile device 104 may include a dynamic profile thermal framework (DPTF) 802, a plurality of DPTF participants 804, an abstraction layer 806, and a plurality of drivers 808. The plurality of drivers 808 may control various hardware 810. For example, the plurality of drivers 808 may include a WiGig driver 812, a WiFi driver 814, other hardware drivers 816, a peripheral component interconnect (PCI) 818, an advanced configuration and power interface (ACPI) 820, and platform drivers 822. The WiGig driver 812 may control WiGig hardware 824, the WiFi driver 814 may control WiFi hardware 826, and the other hardware drivers 816 may control other hardware 828. The PCI 818 may control a system on a chip (SOC) 830 and a platform controller hub 832. The ACPI 820 may control ACPI hardware 834. The ACPI hardware 834 may include fans, thermal sensors, batteries, chargers, etc. 836. The platform drivers 822 may read in various platform parameters 838. The abstraction layer 806 may also include an operating system abstraction 840, platform abstraction 842, a test harness 844, and a HTML 5 module 846, which may reside in a user ring three (R3) space. The plurality of drivers 808 may reside in kernel ring zero (R0) space.

The DPTF participants 804 may include additional sensors and data used to monitor operation of the mobile device 104. For example, the DPTF participants 804 may include thermal sensor data, fan availability, accelerometer data. As a result, the DPTF participants 804 may provide information about a skin temperature of the mobile device 104, orientation of the mobile device 104, fan availability within the mobile device 104 or the mobile IO terminal 102, etc.

The DPTF 802 may include a plurality of policies 850A, 850B, 850C, and 850N (collectively policies 850). The policies 850 may correspond to different operating parameters and modes of operation. For example, policy 850A may correspond to a handheld operation of the mobile device 104 and policy 850B may correspond to connected mode of operation where the mobile device 104 is connected to the mobile IO terminal 102 and receives supplemental cooling from the mobile IO terminal 102.

The operating parameters associated with each of the polices 850 may include a power supplied to a processor of the SOC 830 and acceptable skin temperatures for the mobile device 104. For instance, in a handheld mode of operation, the policy 850A may indicated that the maximum power consumption by the mobile device 102 may be 3.5 W and the maximum skin temperature may be 80° F. As a result, during operation, the SOC 830 may initially draw 3.5 W of power until the skin temperature exceeds 80° F. Once the skin temperature exceeds 80° F., the power consumption by the SOC 830 may be decreased until the skin temperature is at or below 80° F.

When the mobile device 104 is paired with the mobile IO terminal 102 and receiving additional cooling from the mobile IO terminal 102, policy 850B, may specify that the maximum power consumption by the SOC 830 is 7 W and the maximum skin temperature may be 120° F. As such, during operation, the mobile device 102 may operate at a higher power consumption such that the user may utilize the mobile device 104 to achieve laptop like performance from the mobile IO terminal 102.

Figure 9:
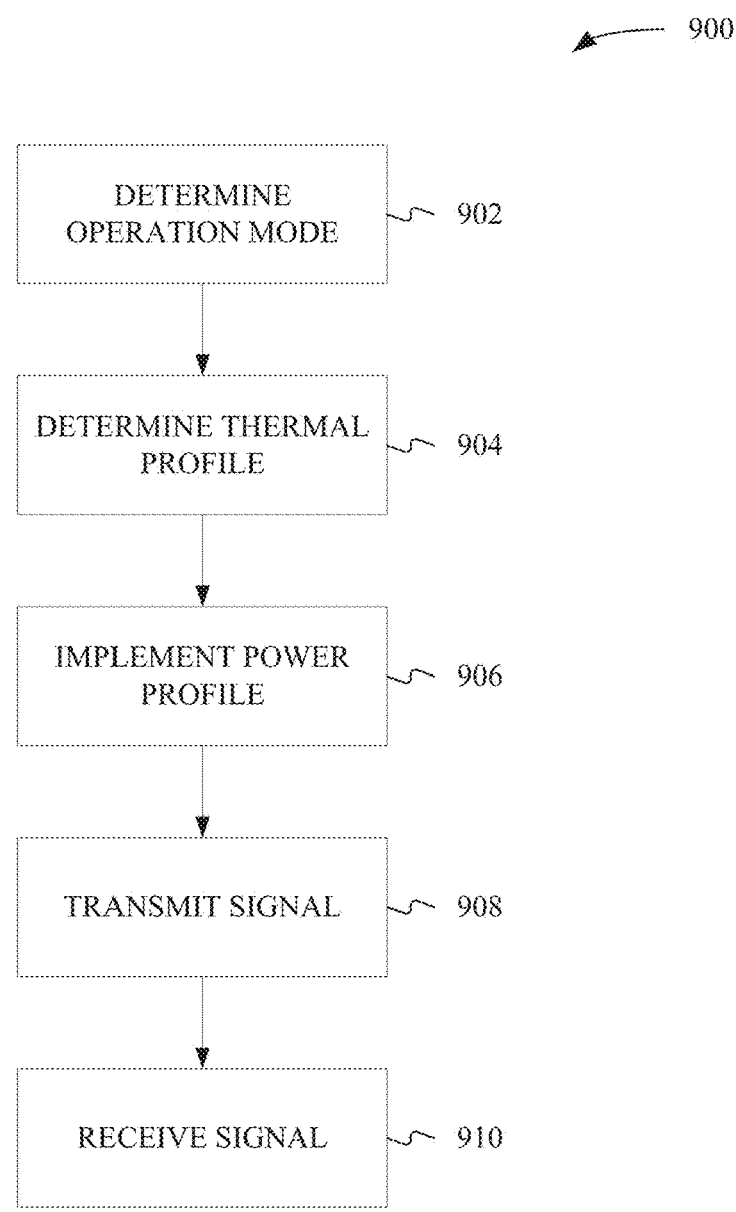
FIG. 9 illustrates a method for controlling a mobile device with a mobile terminal in accordance with some embodiments.

FIG. 9. illustrates a method 900 for controlling a mobile device with a mobile terminal in accordance with some embodiments. The method 900 may begin at stage 902 where a mode of operation of a mobile device may be determined. For example, a plurality of DPTF participants 804 and sensors 836 may be used to determine that the mobile device 104 is paired with the mobile IO terminal 102. The pairing of the mobile device 104 with the mobile IO terminal 102 may result in the mobile device 104 having a particular mode of operation that may differ than when the mobile device 104 is not paired with the mobile IO terminal 102.

From stage 902, the method 900 may proceed to stage 904 where a thermal profile for the mode of operation may be determined. For example, each of the various modes of operation may correspond to one of the policies 850. Each of the policies 850 may include a thermal profile for the mobile device. For example, when the mobile device 104 is paired with the mobile IO terminal 102, temperatures such as a skin temperature of the mobile device 104 may be higher than when the mobile device is operated in a handheld manner.

From stage 904, the method 900 may proceed to stage 906 where a power profile may be implemented to achieve the thermal profile. For example, each of the policies 850 may include one or more power profiles that correspond to the temperature profile and mode of operation. As a result, the mobile device 104 may implement the power profile for the mode of operation.

The power profile may also include changes in a power setting to achieve the thermal profile. For instance, if the mobile device 104 is heating up (e.g., a processor temperature or skin temperature) due to increased performance, the power profile may dictate that the current or voltage to a processor of the mobile device 104 may need to be decreased to keep the temperature within a specified range. If the temperature of the mobile device 104 is below the specified range, the power profile may increase the current or voltage to the process for achieve greater performance from the mobile device. The thermal profiles and power profiles may be selected from a plurality of thermal profiles and power profiles.

Implementing the power profile may include determining a present power setting and increasing or decreasing the present power setting. For example, if the present power setting exceeds a desired power setting then the present power setting may be decreased. If the present power setting is less than the desired power setting then the present power setting may be increased.

From the stage 906, the method 900 may proceed to stage 908 where the mobile device 104 may transmit a signal to the mobile IO terminal 102. The signal may include data describing an operating characteristic of a fan of the mobile IO terminal 102. For example, the signal may include data indicating that the fan needs to operate at a certain fan speed or deliver a certain CFM of airflow. The signal may also transmit the power profile and other operating characteristics of the mobile device 104. For example, the mobile device 104 may transmit temperature and the power profile to the mobile IO terminal 102 and the mobile IO terminal 102 may determine a fan speed at which to operate the fan.

From stage 908, the method 900 may proceed to stage 910 where signals may be received. For example, the processor of the mobile device 104 may receive power signals from sensors within the mobile device 104. The power signals may allow the mobile device 104 to determine if it is operating within the appropriate limits set by the power profile and the thermal profile. The power data may include a voltage or current at which the mobile device 104 is operating. In addition, the power data may include a temperature at which the processor is operating or a skin temperature of the mobile device 104. In addition, the mobile device 104 may receive signals from the mobile IO terminal 102. The signals from the mobile IO terminal 102 may correspond to commands for the mobile device 104 to execute.

Figure 10:
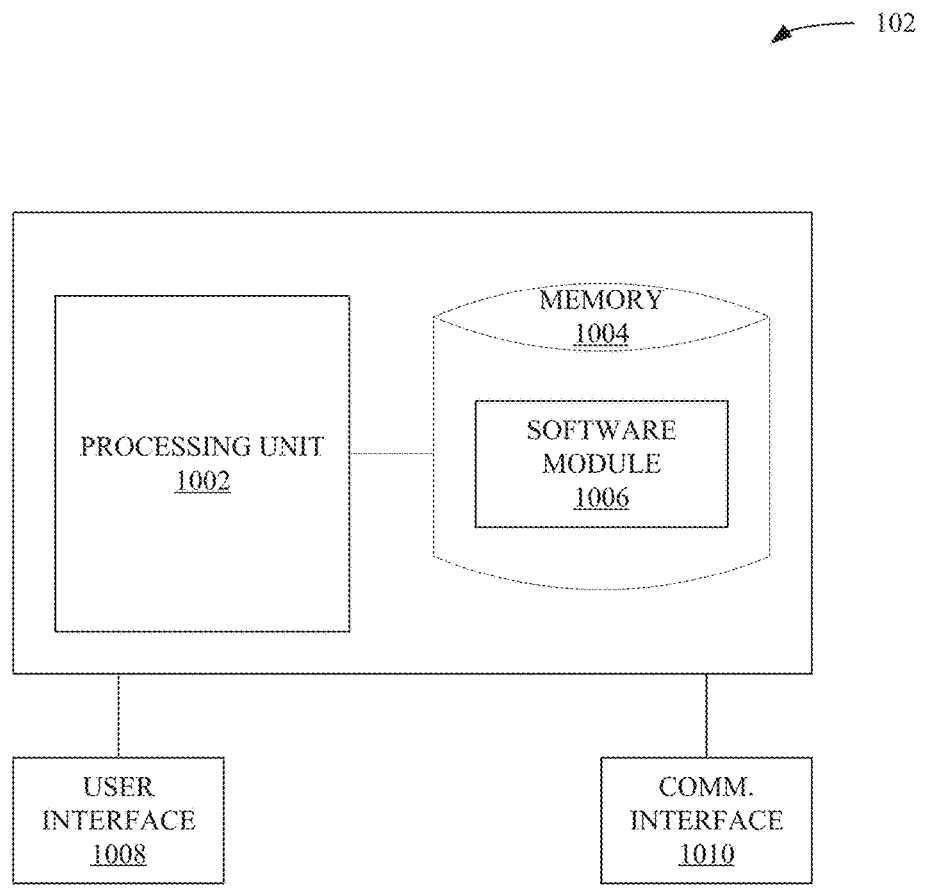
FIG. 10 illustrates a schematic of a mobile IO terminal in accordance with some embodiments.

FIG. 10 shows an example schematic of the mobile IO terminal 102. As shown in FIG. 10, mobile IO terminal 102 may include a processing unit 1002 and a memory unit 1004. Memory unit 1004 may include a software module 1006. While executing on processing unit 1002, software module 1006 may perform processes for controlling a mobile device, including, for example, one or more stages included in method 1100 described below with respect to FIG. 11.

The mobile IO terminal 102 may include a user interface 1008. User interface 1008 may include any number of devices that allow a user to interface with the mobile IO terminal 102. Non-limiting examples of the user interface 1008 include a keypad, joystick, a display (touchscreen or otherwise), etc.

Mobile IO terminal 102 may include a communications interface 1010. Communications interface 1010 may allow the mobile IO terminal 102 to communicate with the mobile device 104. Non-limiting examples of the communications interface 1010 include Ethernet cards (wireless or wired), Bluetooth® transmitters, receivers, near-field communications modules, etc.

As used herein, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

The term "machine-readable medium" may include any medium that is capable of storing, encoding, or carrying instructions for execution by a machine (e.g., the processing unit 1002 or any other module) and that cause a machine to perform any one or more of the techniques of the present disclosure, or that is capable of storing, encoding or carrying data structures used by or associated with such instructions. In other words, the memory unit 1004 may include instructions and may therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

Figure 11:
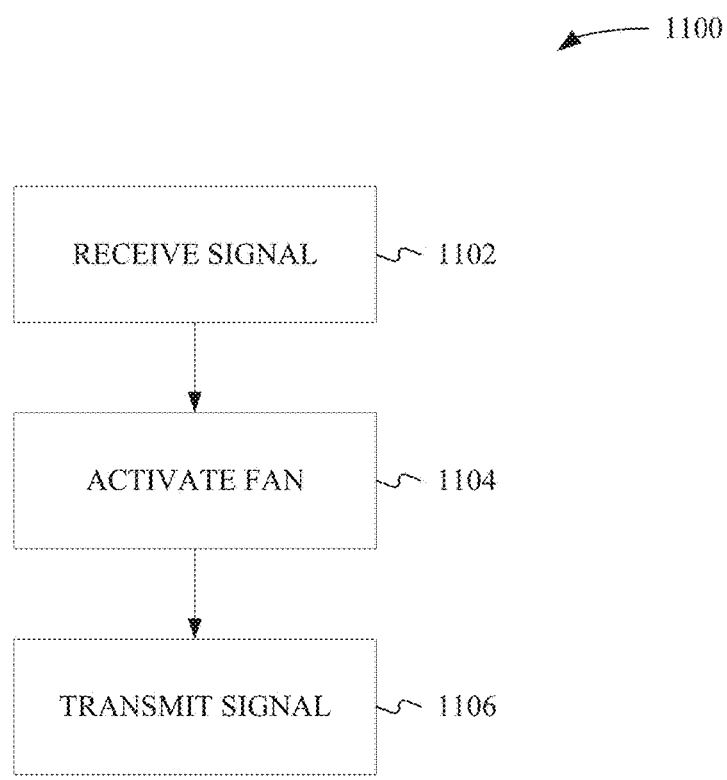
FIG. 11 illustrates a method or controlling the mobile device with the mobile IO terminal in accordance with some embodiments.

The term "transmission medium" shall be taken to include any intangible medium that is capable of storing, encoding or carrying instructions for execution by hardware processing circuitry, and includes digital or analog communications signals or other intangible medium to facilitate communication of such software FIG. 11 illustrates a method 1100 for controlling the mobile device 104 with the mobile IO terminal 102 in accordance with examples disclosed herein. The method 1100 may begin at stage 1102 where the mobile IO terminal 102 may receive a signal from the mobile device 104. The signal may be a pairing signal as disclosed herein. The signal may be a signal directing the mobile IO terminal 102 to activate the fan at a preset fan speed, volumetric flow rate, etc. Upon receiving the signal, the mobile IO terminal 102 may activate the fan (stage 1104).

From stage 1104, the method may proceed to stage 1106 where the mobile IO terminal 102 may transmit a signal to the mobile device 104. The signal transmitted to the mobile device 104 may be a confirmation that the fan has been activated. In addition, the signal may be a command to be implemented by the mobile device 104. For example, the signal may be a command to compile code, edit a photo or video, etc.

Figure 12:
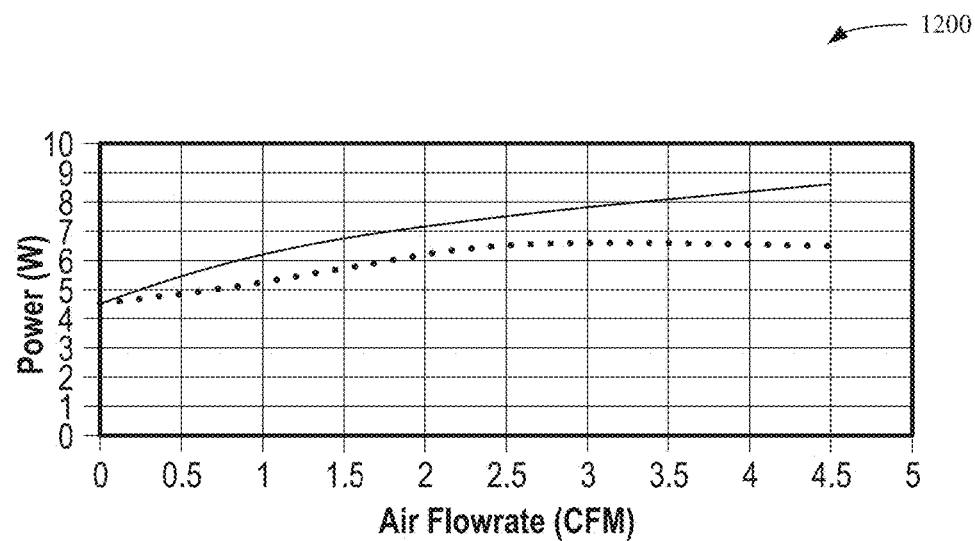
FIG. 12 illustrates a power vs. air flowrate graph in accordance with some embodiments.

FIG. 12 illustrates a power vs. air flowrate graph 1200 according to an example embodiment disclosed herein. Analysis shows that targeted airflow from an external source, such as a fan inside a the mobile IO terminal 102 may increase the mobile device steady state power budget by over 60% from standalone handheld passive configurations. The zero airflow rate corresponds to a handheld mode of operation. For example, with the mobile device resting on a table, the airflow from the mobile IO terminal 102 may allow for an increase in power consumption by the mobile device 104 from 4.5 W to about 6.5 W (dotted line). By elevating the mobile device 104 and allowing for airflow along a bottom surface of the mobile device as well as the top of the mobile device 104, the power consumption may be increased from 4.5 W to about 8.5 W (solid line).

Docking Station

As disclosed herein, methods and apparatuses may simplify and effectively interface with a mobile device, such as a phablet, that has an internal movable component such as a heat exchanger. The methods and apparatuses disclosed herein may greatly enhance the mobile device's thermal performance when mated to the external device. This improved mobile device performance may be accomplished by a device, apparatus or method facilitating the extraction of a thermal component (e.g., heat or other energy) from the mobile device electrically, mechanically, and or a combination thereof from this mobile device.

Previous mobile docking stations commonly on the market today have minimal to no thermal/performance improvements to the mobile device when the device is docked. The methods and apparatuses disclosed herein, greatly extends the possible performance of a docked mobile device by the increased forced convection thermal performance that would not be possible with a small mobile fan within the mobile device.

As disclosed herein, the methods and apparatuses may include mechanically and/or electrically interfacing with a mobile device and improving the mobile device's performance by exposing a captivated thermal improvement device from the mobile device (e.g., a heat transfer base and thermal transfer plates/fins), and exposing the captivated thermal improvement device (e.g., the fins) to an air moving device contained within the docking station. This air moving device may be a blower or axial fan. For example, one or more blowers or fans may be used as the air moving device. The selection of blowers and fans may be based on dock size and noise considerations.

As disclosed herein, a mobile device may have greatly improved thermal power dissipation while the mobile device is docked. For example, while docked the mobile device may have 2× or more the thermal power dissipation vs. in the undocked mode. In addition, while docked the device may dissipate much more power, have higher performance, interface with other docked devices such as monitors, drives, keyboards, mice, etc. This improved docked performance may allow greater user experiences because of the increased system level performance that may not possible during undocked uses.

Figures 13A, 13B:
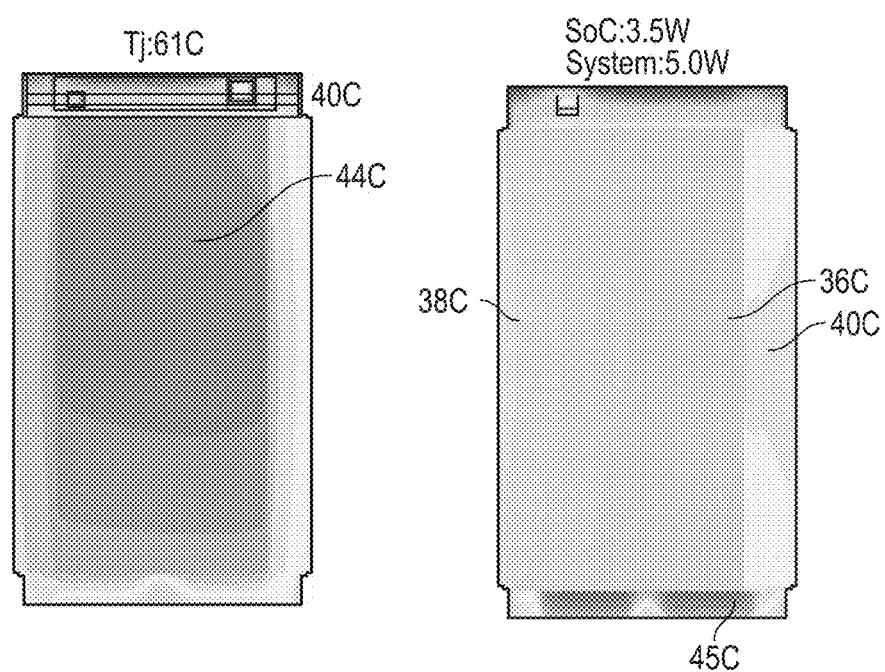
FIGS. 13A and 13B illustrate temperature maps in accordance with some embodiments.

Returning to the figures, FIGS. 13A and 13B illustrate a temperature map of an undocked phablet. FIG. 13A represents the front of the phablet and FIG. 13B represents a rear surface of the phablet. As shown in FIGS. 13A and 13B, a phablet operating at 5.0 W with a SOC power of 3.5 W may exhibit surface temperatures ranging from about 36 C and 44 C, with a temperature at an interface, $T_j$, of about 61 C.

Figure 14A:
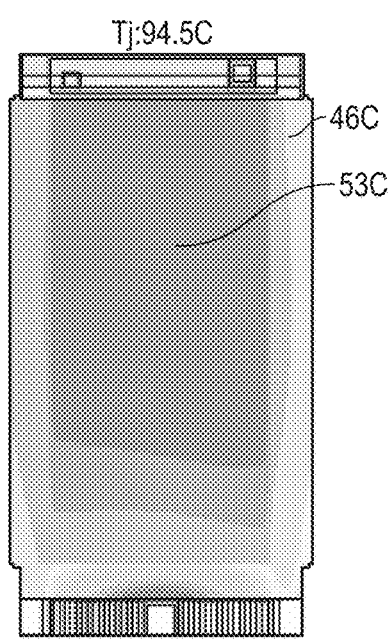
FIGS. 14A and 14B illustrate temperature maps in accordance with some embodiments.
Figure 14B:
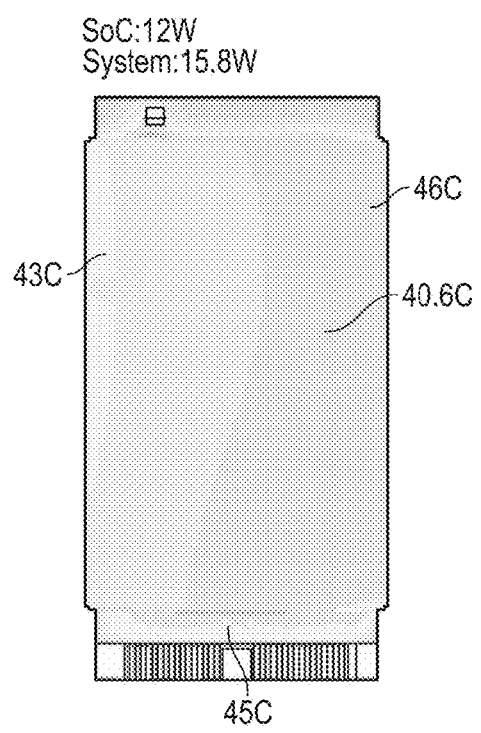

FIGS. 14A and 14B illustrate a temperature map of a docked phablet. FIG. 14A represents the front of the phablet and FIG. 14B represents a rear surface of the phablet. As shown in FIGS. 14A and 14B, a phablet operating at 15.8 W with a SOC power of 12.0 W may exhibit surface temperatures ranging from about 40 C and 53 C, with a temperature at an interface, $T_j$, of about 94.5 C. Table 1 presents data showing operating temperatures for phablets operating at various SOC power levels and resulting temperatures and heat dissipation levels.

TABLE 1

Phablet Performance Data

| | MOS | SOC (W) | System (W) | Display (W) | Back (W) | RHE (W) | $T_j$ (C) |
|---|---|---|---|---|---|---|---|
| Undock | 4.0:44C | 3.8 | 5.3 | 2.0 | 3.0 | NA | 62 |
| Dock | 4.0:44C | 8.0 | 11.0 | 2.3 | 3.6 | 5.0 | 74 |
| Undock | 3.5:55C | 5.3 | 7.3 | 7.8 | 4.2 | NA | 77 |
| Dock | 3.5:55C | 11.0 | 15.0 | 3.0 | 5.0 | 6.8 | 92 |
| Undock | 3.0:55C | 6.5 | 9.0 | 3.4 | 5.0 | NA | 88 |
| Dock | 3.0:55C | 13 | 17 | 3.6 | 6.0 | 8.0 | 104 |

Figure 15A:
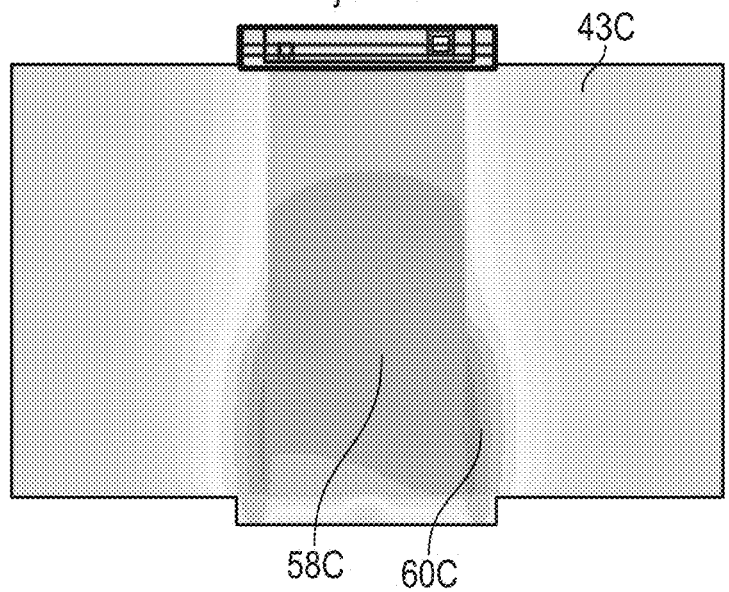
FIGS. 15A and 15B illustrate temperature maps in accordance with some embodiments.
Figure 15B:
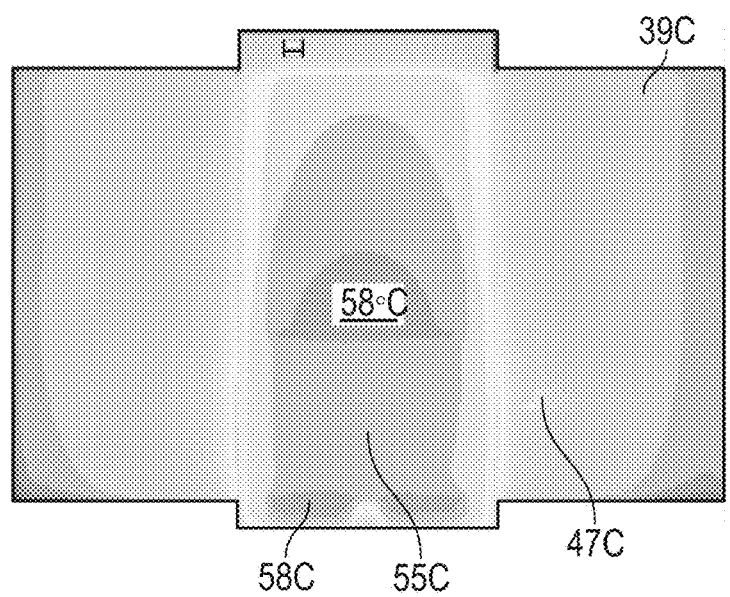

FIGS. 15A and 15B illustrate a temperature map of an undocked tablet. FIG. 15A represents the front of the tablet and FIG. 15B represents a rear surface of the tablet. As shown in FIGS. 15A and 15B, a tablet operating at 15.8 W with a SOC power of 12 W may exhibit surface temperatures ranging from about 47 C and 60 C, with a temperature at an interface, Ti, of about 102 C.

Figure 16A:
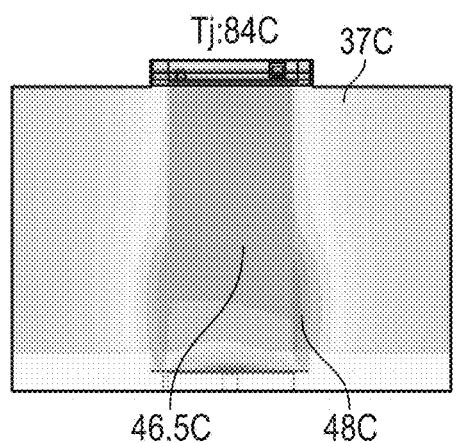
FIGS. 16A and 16B illustrate temperature maps in accordance with some embodiments.
Figure 16B:
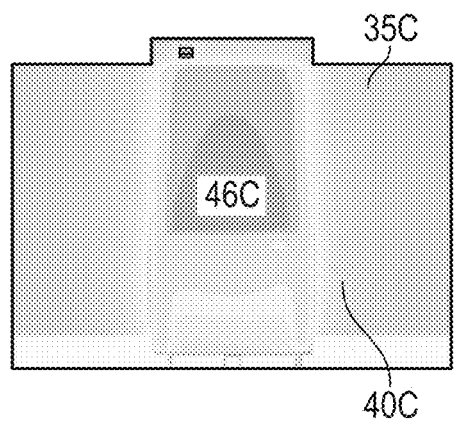

FIGS. 16A and 16B illustrate a temperature map of a docked tablet. FIG. 16A represents the front of the tablet and FIG. 16B represents a rear surface of the tablet. As shown in FIGS. 16A and 16B, a tablet operating at 15.8 W with a SOC power of 12.0 W may exhibit surface temperatures ranging from about 35 C and 48 C, with a temperature at an interface, Ti, of about 84 C. Table 2 below presents data showing operating temperatures for tablets operating at various SOC power levels and resulting temperatures and heat dissipation levels.

TABLE 2

Tablet Performance Data

| | MOS | SOC (W) | System (W) | Display (W) | Back (W) | RHE (W) | $T_j$ (C) |
|---|---|---|---|---|---|---|---|
| Undock | 4.0:44C | 5.0 | 7.5 | 3.3 | 4.2 | NA | 59 |
| Dock | 4.0:44C | 9.0 | 12.5 | 4.0 | 4.5 | 4.4 | 72 |
| Undock | 3.5:55C | 7.0 | 10.0 | 4.4 | 5.7 | NA | 72 |
| Dock | 3.5:55C | 12.5 | 17.0 | 5.3 | 6.2 | 6.0 | 89 |
| Undock | 3.0:55C | 8.5 | 12.0 | 5.1 | 6.9 | NA | 82 |
| Dock | 3.0:55C | 15.5 | 21.0 | 6.4 | 7.7 | 7.4 | 105 |

Figure 17:
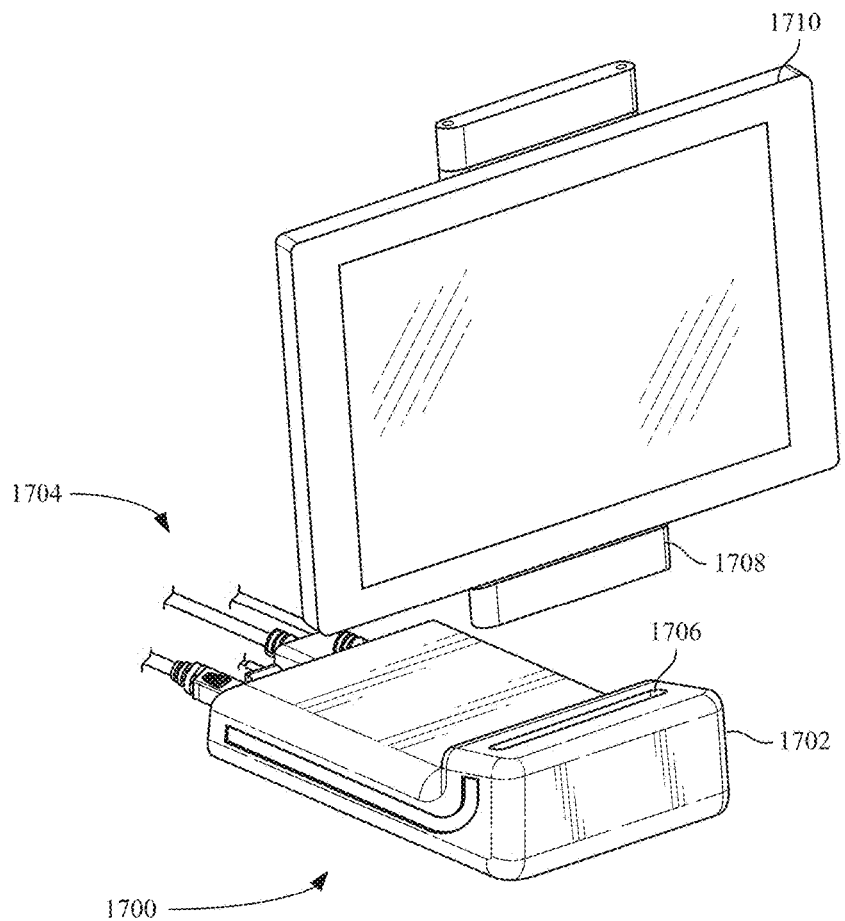
FIG. 17 illustrates a docking station in accordance with some embodiments.

FIG. 17 illustrates an example of a docking station 1700. As shown in FIG. 17, the docking station 1700 may include a body 1702 having one or more electrical connections 1704. The one or more electrical connections 1704 may allow the docking station 1700 to connect to other computing devices such as, but not limited to, mobile IO terminals and remote computers. The body 1702 may define an opening 1706. The opening 1706 may be sized to receive a portion of a mobile device 1708. The mobile device 1708 may include tablets and phablets as disclosed herein as well as a portable display 1710 as shown in FIG. 17.

Figure 18:
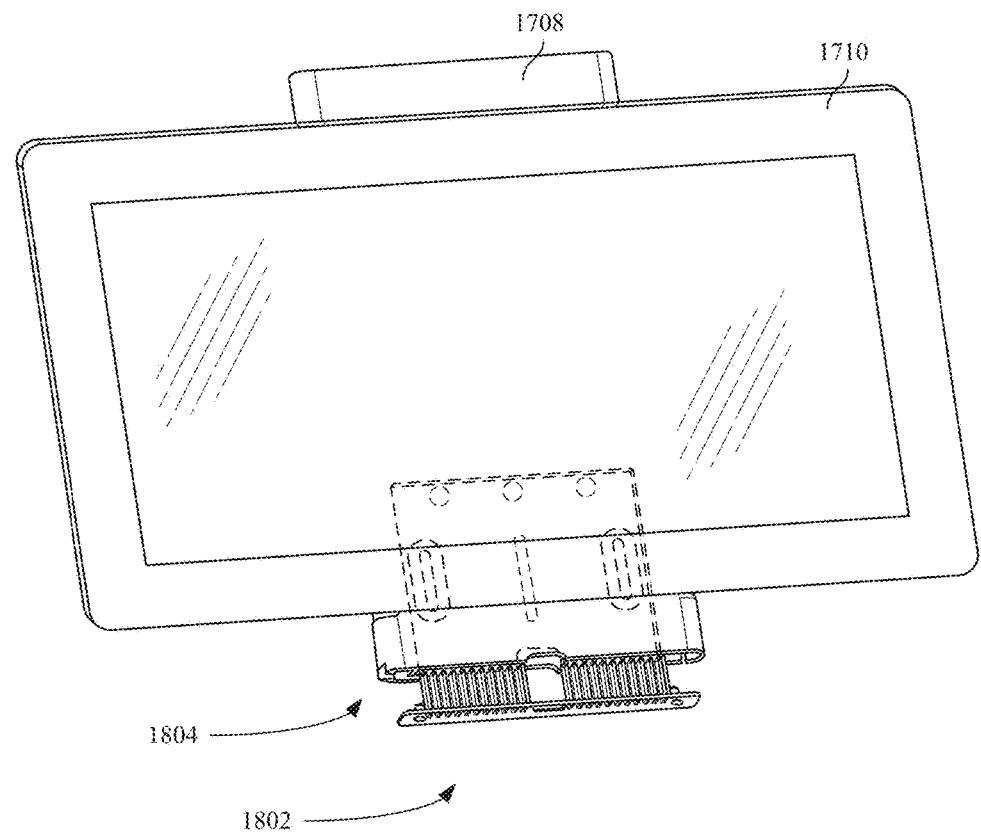
FIG. 18 illustrates a mobile device in accordance with some embodiments.

FIG. 18 illustrates the mobile device 1708 in accordance with examples disclosed herein. As shown in FIG. 18, the mobile device 1708 may include a heat exchanger 1802. The heat exchanger 1802 may extend from and retract into a body portion 1804 of the mobile device 1708. As a result, when the mobile device 1708 is not docked with the docking station 1700, the heat exchanger 1802 may retract into the mobile device 1708 for storage and when the mobile device 1708 is docked with the docking station 1700, the heat exchanger 1802 may extend to provide additional cooling capacity as disclosed herein.

Figure 19:
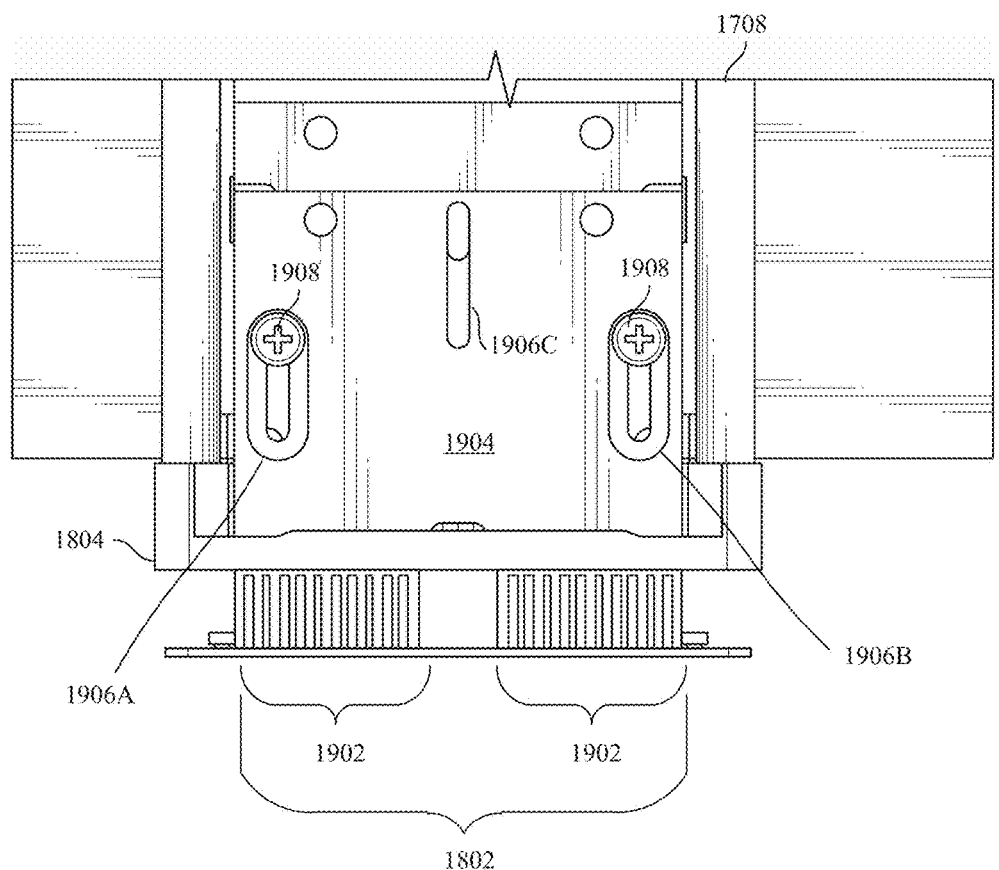
FIG. 19 illustrates a heat exchanger in accordance with some embodiments.

FIG. 19 illustrates the heat exchanger 1802 in accordance with examples disclosed herein. As shown in FIG. 19, the heat exchanger 1802 may include a plurality of fins 1902 and a conductive surface 1904. During use, the conductive surface 1904 may be located in close proximity or in direct contact with a heat source of the mobile device 1708. Non-limiting examples of a heat source include a processor, memory, or other electrical components. The plurality of fins 1902 may allow air movement generated by the docking station 1700 to remove heat from the heat exchanger 1802 and the mobile device 1708.

The conductive surface 1904 may include one or more grooves 1906A, 1906B, and 1906C (collectively grooves 1906). The grooves 1906 may allow the heat exchanger 1802 to be connected to the mobile device 1708 via fasteners 1908. In addition, the grooves 1906 allow the heat exchanger 1802 to have a range of motion such that the heat exchanger 1802 may extend from and retract into the body portion 1804 of the mobile device 1708. While FIG. 19 illustrates grooves, other configurations are contemplated for securing the heat exchanger 1802 to the mobile device 1708, while still permitting movement of the heat exchanger 1802.

Figure 20:
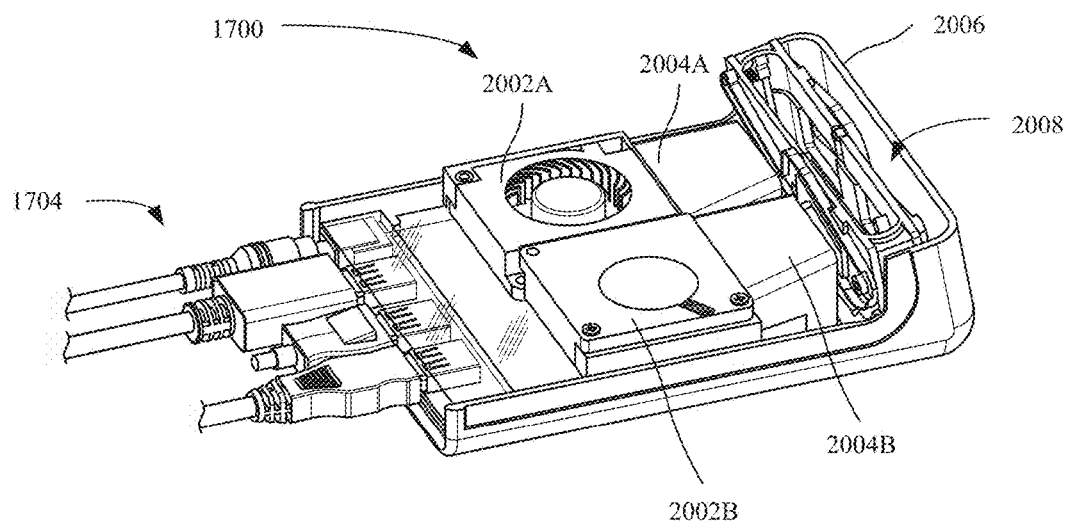
FIG. 20 illustrates internal components of a docking station in accordance with some embodiments.

FIG. 20 illustrates internal components of the docking station 1700. As shown in FIG. 20, the docking station 1700 may include one or more fans 2002A and 2002B (collectively fans 2002). The fans 2002 may each be connected to a respective duct 2004A and 2004B (collectively ducts 2004). The ducts 2004 may allow the fans 2002 to direct airflow towards a cavity 2006. The cavity 2006 may house an extraction assembly 2008. The extraction assembly 2008 may be used to extend and retract the heat exchanger.

Figure 21:
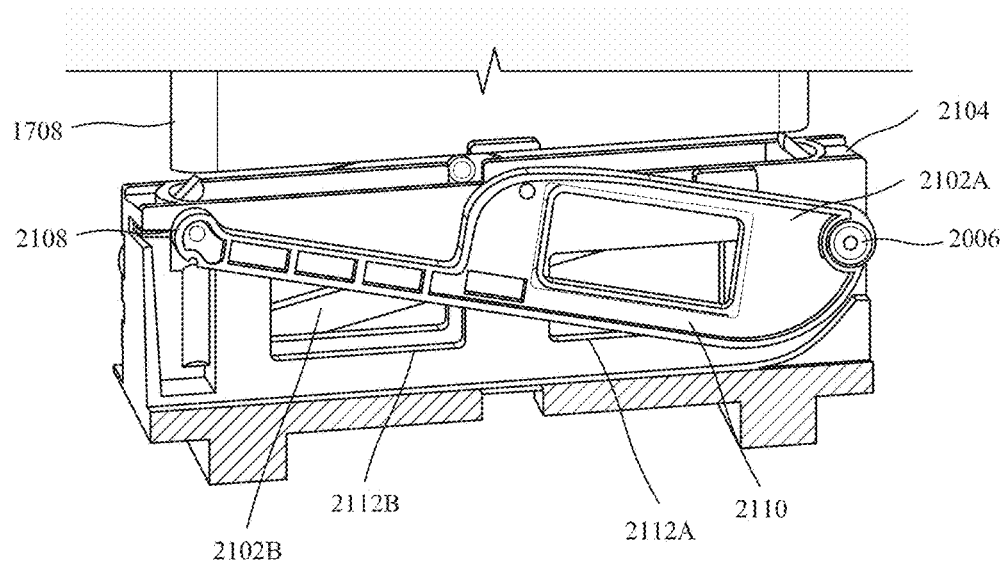
FIG. 21 illustrates an extractor assembly in accordance with some embodiments.
Figure 22:
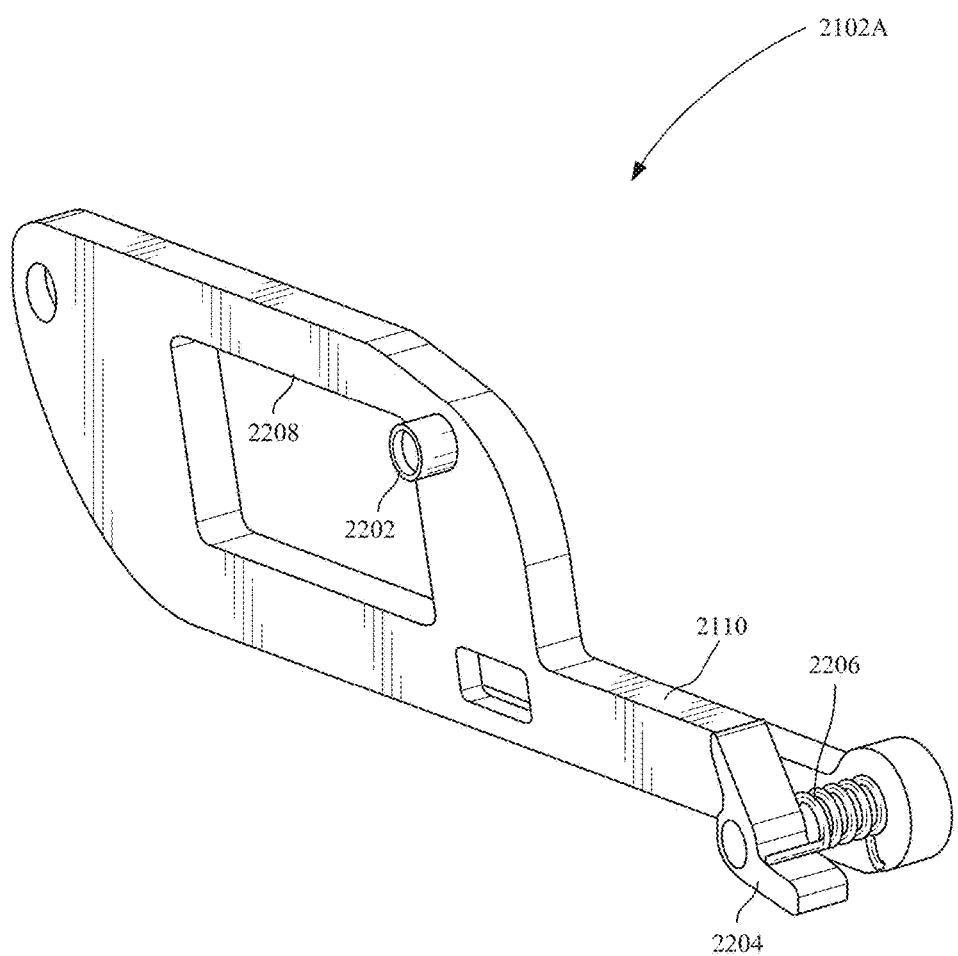
FIG. 22 illustrates a retraction arm in accordance with some embodiments.

FIG. 21 illustrates the extraction assembly 2008 in accordance with an example disclosed herein. The extraction assembly 2008 may include one or more retraction arms 2102A and 2102B (collectively retraction arms 2102). As shown in FIG. 21, the retraction arms 2102 may be attached to a body 2104 at a pivot point 2106. The pivot point for the retraction arm 2102B is not shown in FIG. 21. As shown in FIG. 22, the retraction arm 2102A may include roller pin 2202 and a retraction hook 2204. As discussed herein, upon insertion of the mobile device 1708 into the docking station 1700, the mobile device 1708 may contact the roller pin 2202 and cause the retraction arms 2102 to move. During movement, retraction hook 2204 may engage the heat exchanger 1802. Movement of the retraction hook 2204 may be controlled via contact with the heat exchanger 1702 and a coil spring 2206.

Figure 23:
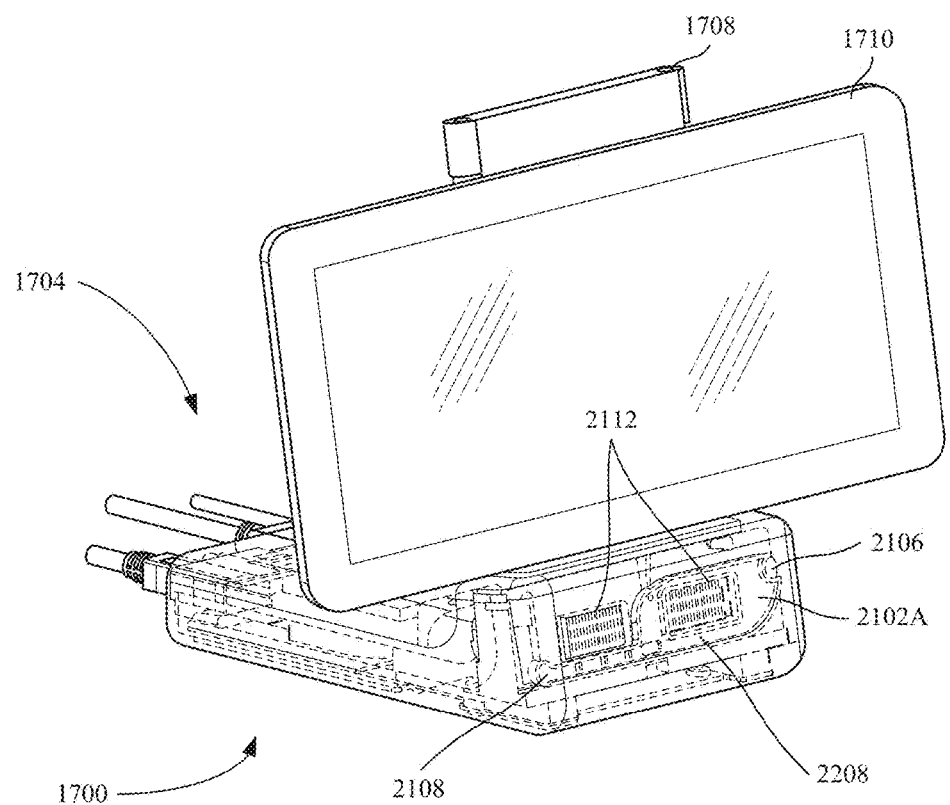
FIG. 23 illustrates a mobile device docked with a docking station in accordance with some embodiments.

As shown in FIG. 22, the retraction arms 2012 may define an opening 2208. As shown in FIG. 21, when a first end of the retraction arm 2102A is in a first position 2108, a portion 2110 of the retraction arm 2102A may block one or more openings 2112A and 2112B (collectively openings 2112) defined by the body 2104. However, as the heat exchanger 1802 is inserted into the docking station 1700, the contact between the mobile device 1708 and the roller pin 2202 may cause the retraction arm 2102A to pivot about the pivot point 2106. The pivoting motion of the retraction arms 2102 may cause the window 2208 of the retraction arms 2102 to align with the windows 2112 defined by the body 2104 as shown in FIG. 23.

While FIGS. 21 and 22 illustrate the use of retraction arms to extend and retract the heat exchanger 1802, other methods such as springs, biasing members, etc. are contemplated for extension and retraction of the heat exchanger 1802. For example, a spring may be placed in the mobile device 1708 that may cause the heat exchange 1802 to extend upon a user opening a panel on the mobile device 1708. In another example, shape memory alloys, motors, sprung telescoping slider, and magnets may be used to extend and retract the heat exchanger 1802.

Figure 24:
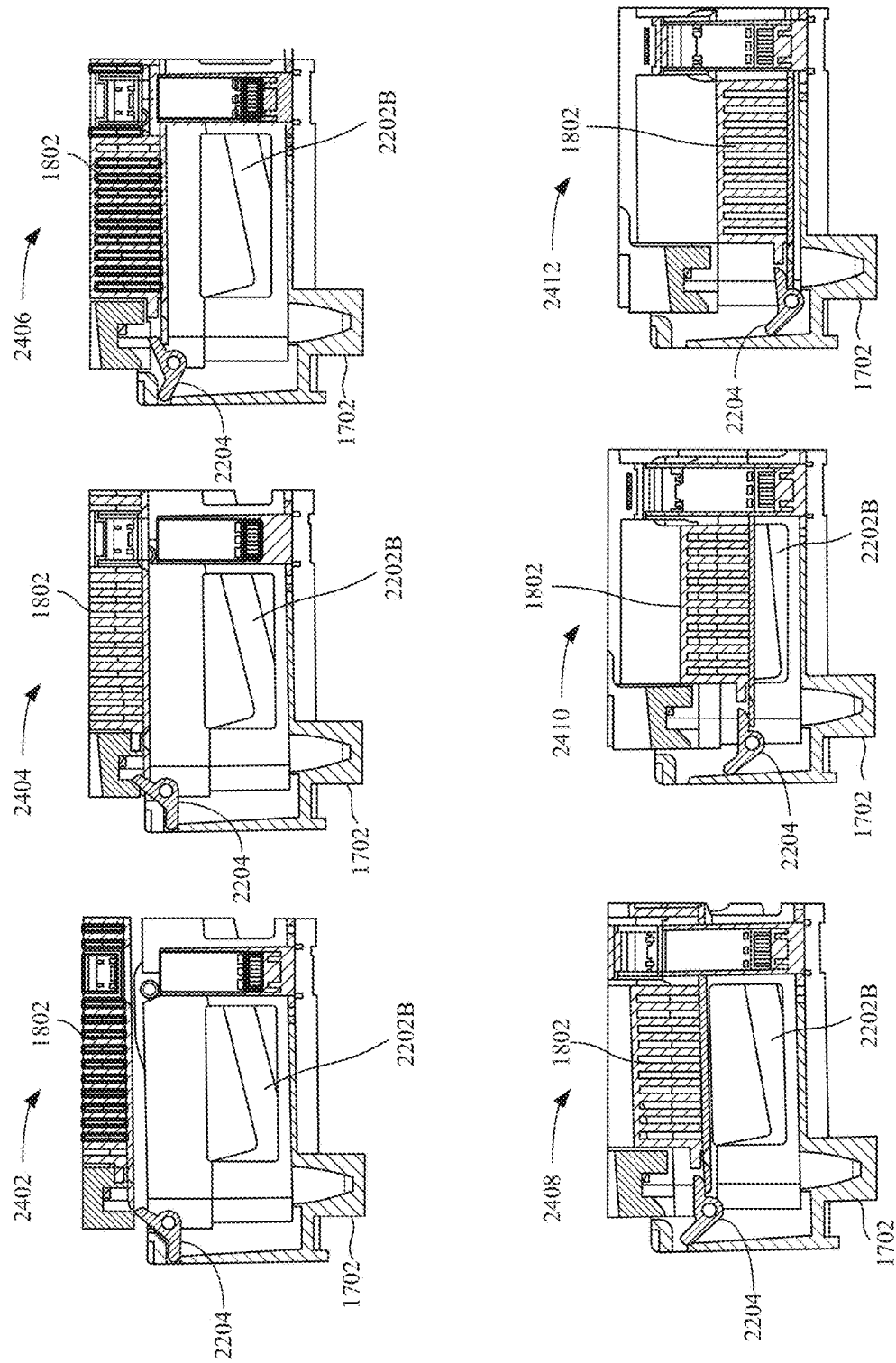
FIG. 24 illustrates a method in accordance with some embodiments.

FIG. 24 illustrates an example method for docking the mobile device 1708 with the docking station 1700. The method may begin at stage 2402 where the mobile device 1708 may contact the docking station 1700. At stage 2404, the mobile device 1708 applies pressure to the roller pin 2202 and the retraction hook 2204 may contact the heat exchanger 1802. At stage 2406, as the retraction hook 2204 may rotation due to contact with the body 1702 as the retraction arms 2102 progresses in a downward manner. The rotation of the retraction hook 2204 may allow the retraction hook 2204 to engage the heat exchanger 1802 and as shown in stages 2408 through 2412, the continued downward movement of the heat exchanger 1802 may cause the retraction hook 2204 to work in connection with the retraction arms 2102 to extend the heat exchanger 1802 from the mobile device 1708.

When the mobile device 1708 is removed from the docking station 170, the method stages may be reversed and the heat exchanger 1802 retracted into the mobile device 1708. In addition, the heat exchanger 1802 may include a spring or other biasing member than may assist in retracting the heat exchanger 1802.

Additional Notes & Examples

Example 1 is a mobile device located proximate a mobile terminal and controlled by the mobile terminal, the mobile device comprising: a processor; and a memory storing instructions that, when executed by the processor, cause the processor to: determine a mode of operation of the mobile device, determine a thermal profile for the mode of operation of the mobile device, and implement a power profile to achieve the thermal profile.

In Example 2, the subject matter of Example 1 optionally includes transmitting the power profile to the mobile terminal.

In Example 3, the subject matter of any one or more of Examples 1-2 optionally include wherein determining the thermal profile includes selecting the thermal profile from a plurality of thermal profiles.

In Example 4, the subject matter of any one or more of Examples 1-3 optionally include wherein determining the power profile includes selecting the power profile from a plurality of power profiles.

In Example 5, the subject matter of any one or more of Examples 1-4 optionally include wherein the instructions further cause the processor to receive thermal data from a plurality of sensors located within the mobile device.

In Example 6, the subject matter of Example 5 optionally includes wherein the thermal data includes a skin temperature of the mobile device.

In Example 7, the subject matter of Example 5 optionally includes wherein the thermal data includes a processor temperature.

In Example 8, the subject matter of any one or more of Examples 1-7 optionally include wherein the instructions further cause the processor to transmit a signal to the mobile terminal, the signal including fan data describing an operational characteristic of a fan of the mobile terminal.

In Example 9, the subject matter of any one or more of Examples 1-8 optionally include wherein the power profile includes data defining an operating voltage for the processor.

In Example 10, the subject matter of any one or more of Examples 1-8 optionally include wherein the power profile includes data defining an operating current for the processor.

Example 11 is a method of controlling a mobile device via a mobile terminal, the method comprising: determining, by the mobile device, a mode of operation of the mobile device; determining, by the mobile device, a thermal profile for the mode of operation of the mobile device; and implementing, by the mobile device, a power profile to achieve the thermal profile.

In Example 12, the subject matter of Example 11 optionally includes transmitting the power profile to the mobile terminal.

In Example 13, the subject matter of any one or more of Examples 11-12 optionally include wherein determining the thermal profile includes selecting the thermal profile from a plurality of thermal profiles.

In Example 14, the subject matter of any one or more of Examples 11-13 optionally include wherein determining the power profile includes selecting the power profile from a plurality of power profiles.

In Example 15, the subject matter of any one or more of Examples 11-14 optionally include further comprising sensing, using a plurality of sensors within the mobile device, thermal data from the mobile device.

In Example 16, the subject matter of Example 15 optionally includes wherein the thermal data includes a skin temperature of the mobile device.

In Example 17, the subject matter of Example 15 optionally includes wherein the thermal data includes a processor temperature.

In Example 18, the subject matter of any one or more of Examples 11-17 optionally include further comprising transmitting a signal to the mobile terminal, the signal including fan data describing an operational characteristic of a fan of the mobile terminal.

In Example 19, the subject matter of any one or more of Examples 11-18 optionally include wherein the power profile includes data defining an operating voltage or an operating current for the mobile device.

Example 20 is at least one computer-readable medium comprising instructions to perform any of the methods of Examples 11-19.

Example 21 is an apparatus comprising means for performing any of the methods of Examples 11-19.

Example 22 is at least one computer-readable medium comprising instructions that, when executed by a processor, cause the processor to: receive a pairing signal from a mobile terminal; determine a mode of operation of a mobile device; determine a thermal profile for the mode of operation of the mobile device; and implementing a power profile to achieve the thermal profile.

In Example 23, the subject matter of Example 22 optionally includes wherein the instructions further cause the processor to transmit the power profile to the mobile terminal configured to control the mobile device.

In Example 24, the subject matter of any one or more of Examples 22-23 optionally include wherein determining the thermal profile includes selecting the thermal profile from a plurality of thermal profiles.

In Example 25, the subject matter of any one or more of Examples 22-24 optionally include wherein determining the power profile includes selecting the power profile from a plurality of power profiles.

In Example 26, the subject matter of any one or more of Examples 22-25 optionally include wherein the instructions further cause the processor to receive thermal data from a plurality of sensors located within the mobile device.

In Example 27, the subject matter of Example 26 optionally includes wherein the thermal data includes a skin temperature of the mobile device.

In Example 28, the subject matter of Example 26 optionally includes wherein the thermal data includes a processor temperature.

In Example 29, the subject matter of any one or more of Examples 22-28 optionally include wherein the instructions further cause the processor to transmit a signal to the mobile terminal, the signal including fan data describing an operating parameter of a fan of the mobile terminal.

In Example 30, the subject matter of any one or more of Examples 22-29 optionally include wherein the power profile includes data defining an operating voltage or operating current for the mobile device.

Example 31 is a mobile device controlled by a mobile terminal, the mobile device located proximate the mobile terminal, the mobile device comprising: means for pairing the mobile device with the mobile terminal; means for determining a mode of operation of the mobile device, means for determining a thermal profile for the mode of operation of the mobile device, and means for determining a power profile to achieve the thermal profile.

In Example 32, the subject matter of Example 31 optionally includes means for transmitting the power profile to the mobile terminal.

In Example 33, the subject matter of any one or more of Examples 31-32 optionally include wherein the means for determining the thermal profile include means for selecting the thermal profile from a plurality of thermal profiles.

In Example 34, the subject matter of any one or more of Examples 31-33 optionally include wherein the means for determining the power profile include means for selecting the power profile from a plurality of power profiles.

In Example 35, the subject matter of any one or more of Examples 31-34 optionally include means for receiving thermal data of the mobile device.

In Example 36, the subject matter of Example 35 optionally includes wherein the thermal data includes a skin temperature of the mobile device.

In Example 37, the subject matter of Example 35 optionally includes wherein the thermal data includes a processor temperature.

In Example 38, the subject matter of any one or more of Examples 31-37 optionally include means for transmitting a signal to the mobile terminal, the signal including fan data describing an operating parameter of a fan of the mobile terminal.

In Example 39, the subject matter of any one or more of Examples 31-38 optionally include wherein the power profile includes data defining an operating voltage for the mobile device.

In Example 40, the subject matter of any one or more of Examples 31-38 optionally include wherein the power profile includes data defining an operating current for the mobile device.

Example 41 is a mobile device controllable by a mobile terminal, the mobile device comprising: a sensor; a processor, and a memory storing instructions that, when executed by the processor, cause the processor to: receive a power signal from the sensor, the power signal including power data, receive, from the mobile terminal, a power profile, the power profile including a desired power setting, and implement the power profile such that the power data corresponds to the desired power setting.

In Example 42, the subject matter of Example 41 optionally includes wherein the power data includes temperature data.

In Example 43, the subject matter of any one or more of Examples 41-42 optionally include wherein the power data includes current data.

In Example 44, the subject matter of any one or more of Examples 41-43 optionally include wherein the power data includes voltage data.

In Example 45, the subject matter of any one or more of Examples 41-44 optionally include wherein the power data includes a skin temperature of the mobile device.

In Example 46, the subject matter of Example 45 optionally includes wherein the desired power setting specifies a maximum skin temperature of the mobile device.

In Example 47, the subject matter of any one or more of Examples 41-46 optionally include wherein implementing the power profile includes the processor operative to: determine a present power setting; increase a voltage to the processor when the power data indicates the present power setting is lower than the desired power setting; and decrease the voltage to the processor when the power data indicates the present power setting is greater than the desired power setting.

In Example 48, the subject matter of any one or more of Examples 41-47 optionally include wherein the power profile includes data defining an operating voltage for the desired power setting.

In Example 49, the subject matter of any one or more of Examples 41-48 optionally include wherein the power profile corresponds to one of a plurality of thermal profiles.

In Example 50, the subject matter of any one or more of Examples 41-49 optionally include wherein the mobile device includes a foot configured to elevate a rear surface of the mobile device above a work surface.

In Example 51, the subject matter of any one or more of Examples 41-50 optionally include wherein the mobile device includes a folio cover, the folio cover arranged to conduct heat away from the mobile device.

In Example 52, the subject matter of any one or more of Examples 41-49 optionally include wherein the mobile device includes a heat exchanger configured to extend from an interior portion of the mobile device.

In Example 53, the subject matter of Example 52 optionally includes wherein the heat exchanger is configured to connect to a docking station.

In Example 54, the subject matter of Example 53 optionally includes wherein the heat exchanger extends from the interior portion of the mobile device upon connecting to the docking station.

In Example 55, the subject matter of any one or more of Examples 41-49 optionally include wherein the mobile device is configured to attach to the mobile terminal.

Example 56 is a method of controlling a mobile device via a mobile terminal, the method comprising: receiving, from a sensor of the mobile device at a processor of the mobile device, a power signal including power data, receiving, from the mobile terminal, a power profile, the power profile including a desired power setting; and implementing, by the mobile device, the power profile such that the power data corresponds to the desired power setting.

In Example 57, the subject matter of Example 56 optionally includes wherein receiving the power signal includes receiving temperature data.

In Example 58, the subject matter of Example 57 optionally includes wherein the temperature data includes a skin temperature of the mobile device.

In Example 59, the subject matter of Example 56 optionally includes wherein receiving the power signal includes receiving a current data.

In Example 60, the subject matter of Example 56 optionally includes wherein receiving the power signal includes receiving voltage data.

In Example 61, the subject matter of Example 56 optionally includes wherein the desired power setting specifies a maximum skin temperature of the mobile device.

In Example 62, the subject matter of any one or more of Examples 56-61 optionally include wherein implementing the power profile includes: determining a present power setting; and increasing a voltage to the processor when the power data indicates the present power setting is lower than the desired power setting; and decreasing the voltage to the processor when the power data indicates the present power setting is greater than the desired power setting.

In Example 63, the subject matter of any one or more of Examples 56-62 optionally include connecting the mobile device to a docking station.

In Example 64, the subject matter of any one or more of Examples 56-63 optionally include extending a heat exchanger from an interior portion of the mobile device.

In Example 65, the subject matter of any one or more of Examples 56-64 optionally include attaching the mobile device to the mobile terminal.

Example 66 is at least one computer-readable medium comprising instructions to perform any of the methods of Examples 56-65.

Example 67 is an apparatus comprising means for performing any of the methods of Examples 56-65.

Example 68 is at least one computer-readable medium comprising instructions that, when executed by a processor, cause the processor to: receive, from a sensor of the mobile device at a processor of the mobile device, a power signal including power data; receive, from the mobile terminal, a power profile, the power profile including a desired power setting; and implement, by the mobile device, the power profile such that the power data corresponds to the desired power setting.

In Example 69, the subject matter of Example 68 optionally includes wherein receiving the power signal includes the processor operative to receive temperature data.

In Example 70, the subject matter of Example 69 optionally includes wherein the temperature data includes a skin temperature of the mobile device.

In Example 71, the subject matter of Example 68 optionally includes wherein receiving the power signal includes the processor operative to receive a current data.

In Example 72, the subject matter of Example 68 optionally includes wherein receiving the power signal includes the processor operative to receive voltage data.

In Example 73, the subject matter of any one or more of Examples 68-72 optionally include wherein the desired power setting specifies a maximum skin temperature of the mobile device.

In Example 74, the subject matter of any one or more of Examples 68-73 optionally include wherein implementing the power profile includes the processor operative to: determine a present power setting; and increase a voltage to the processor when the power data indicates the present power setting is lower than the desired power setting; and decrease the voltage to the processor when the power data indicates the present power setting is greater than the desired power setting.

Example 75 is a mobile device controllable by a mobile terminal, the mobile device comprising: means for a sensing a power consumption of the mobile device; means for receiving the power consumption from the sensing means; means for receiving, from the mobile terminal, a power profile, the power profile including a desired power setting; and means for implementing the power profile such that the power consumption corresponds to the desired power setting.

In Example 76, the subject matter of Example 75 optionally includes wherein sensing means includes means for determining a current draw.

In Example 77, the subject matter of Example 75 optionally includes wherein sensing means includes means for determining a voltage drop at a processor of the mobile device.

In Example 78, the subject matter of Example 75 optionally includes wherein the sensing means includes means for determining a skin temperature of the mobile device.

In Example 79, the subject matter of Example 75 optionally includes wherein the desired power setting specifies a maximum skin temperature of the mobile device.

In Example 80, the subject matter of any one or more of Examples 75-79 optionally include wherein the implementing means further comprise: means for determining a present power setting; means for increasing a voltage to a processor of the mobile device when the power consumption indicates the present power setting is lower than the desired power setting; and means for decreasing the voltage to the processor when the power consumption indicates the present power setting is greater than the desired power setting.

In Example 81, the subject matter of any one or more of Examples 75-80 optionally include wherein the power profile corresponds to one of a plurality of thermal profiles.

In Example 82, the subject matter of any one or more of Examples 75-81 optionally include means for elevating a rear surface of the mobile device above a work surface.

In Example 83, the subject matter of any one or more of Examples 75-82 optionally include means for exchanging heat from the mobile device.

In Example 84, the subject matter of any one or more of Examples 75-83 optionally include means for connecting the mobile device to a docking station.

In Example 85, the subject matter of any one or more of Examples 75-84 optionally include means for extending a heat exchanger from an interior portion of the mobile device upon connecting to a docking station.

In Example 86, the subject matter of any one or more of Examples 75-85 optionally include means for attaching the mobile device to the mobile terminal.

Example 87 is a docking station for removing heat from a mobile device, the docking station comprising: an air mover; a duct having an inlet and an exhaust, the inlet arranged to receive airflow from the air mover; and an extraction assembly in fluid communication with the exhaust of the duct, the extraction assembly configured to extract a heat exchanger from the mobile device upon docking the mobile device with the extraction assembly.

In Example 88, the subject matter of Example 87 optionally includes wherein the extraction assembly includes: a body; and a retraction arm pivotably connected to the body, the retraction arm configured to engage the heat exchanger such that pivoting of the retraction arm in a first direction translates the heat exchanger from a first state to a second state and pivoting of the retraction arm in a second direction translates the heat exchanger from the second state to the first state.

In Example 89, the subject matter of Example 88 optionally includes wherein the extraction assembly further includes a retraction hook located at a first end of the retraction arm, the retraction hook configured to engage the heat exchanger upon insertion of the heat exchanger into the extraction assembly.

In Example 90, the subject matter of any one or more of Examples 88-89 optionally include wherein pivoting of the retraction arm is caused by contact between the mobile device and the retraction arm.

In Example 91, the subject matter of any one or more of Examples 88-90 optionally include wherein the body defines an opening proximate the exhaust of the duct and proximate the heat exchanger when the heat exchanger is in an extracted state.

In Example 92, the subject matter of Example 88 optionally includes a second retraction arm pivotably connected to the body such that pivoting of the second retraction arm in a third direction translates the heat exchanger from the first state to the second state and pivoting of the retraction arm in a forth direction translates the heat exchanger from the second state to the first state.

Example 93 is a docking station for removing heat from a mobile device, the docking station comprising: means for moving air within the docking station and across a heat exchanger extending from the mobile device; and means for extracting the heat exchanger from the mobile device upon docking the mobile device with the extracting means.

In Example 94, the subject matter of Example 93 optionally includes retention means for retaining the heat exchanger upon insertion of the heat exchanger into the extracting means.

In Example 95, the subject matter of Examples 93 optionally includes wherein the extracting means include: a body; and means for engaging the heat exchanger such that movement of the mobile device in a first direction translates the heat exchanger from a first state to a second state and movement of the mobile device in a second direction translates the heat exchanger from the second state to the first state.

Example 96 is a docking station for removing heat from a mobile device, the docking station comprising: a duct having an inlet and an exhaust; a body defining a first opening, a second opening, and a cavity, the first opening in fluid communication with the exhaust, the second opening sized to receive a heat exchange; and an extraction assembly connected to the body, the extraction assembly configured to extract a heat exchanger from the mobile device upon docking the mobile device with the extraction assembly.

In Example 97, the subject matter of Example 96 optionally includes wherein the extraction assembly includes a retraction arm pivotably connected to the body, the retraction arm configured to engage the heat exchanger such that pivoting of the retraction arm in a first direction translates the heat exchanger from a first state to a second state and pivoting of the retraction arm in a second direction translates the heat exchanger from the second state to the first state.

In Example 98, the subject matter of Example 97 optionally includes wherein the extraction assembly further includes a retraction hook located at a first end of the retraction arm, the retraction hook configured to engage the heat exchanger upon insertion of the heat exchanger into the second opening.

In Example 99, the subject matter of any one or more of Examples 97-98 optionally include wherein pivoting of the retraction arm is caused by contact between the mobile device and the retraction arm.

In Example 100, the subject matter of Example 97 optionally includes a second retraction arm pivotably connected to the body such that pivoting of the second retraction arm in a third direction translates the heat exchanger from the first state to the second state and pivoting of the retraction arm in a forth direction translates the heat exchanger from the second state to the first state.

Example 101 is a mobile terminal for controlling a mobile device, the mobile terminal comprising: a chassis; a fan located within the chassis; a receiver configured to receive a signal from the mobile device; a processor in electrical communication with the fan and the receiver; and a memory storing instructions that, when executed by the processor, cause the processor to: receive the signal from the receiver, the signal including fan data describing an operating characteristic of the fan, and activate the fan such that the fan operates according to the operating characteristic.

In Example 102, the subject matter of Example 101 optionally includes wherein the operating characteristic includes a fan speed.

In Example 103, the subject Example 101 optionally includes wherein the instructions, when executed by the process, further cause the processor to generate input signals, the input signals transmittable to the mobile device and commands for operating the mobile device.

In Example 104, the subject matter of any one or more of Examples 101-103 optionally include a docking station configured to receive the mobile device.

In Example 105, the subject matter of Example 104 optionally includes wherein the docking station is configured to extract a heat exchanger from the mobile device.

In Example 106, the subject matter of any one or more of Examples 101-103 optionally a stand configured to connect the mobile device to the chassis.

In Example 107, the subject matter of any one or more of Examples 101-103 optionally include an illumination source configured to project an outline on a surface, the outline showing a placement of the mobile device on the surface.

Example 108 is a mobile terminal for controlling a mobile device, the mobile terminal comprising: means for blowing air across the mobile device; means for receiving a signal from the mobile device, the signal including data describing an operating characteristic of the blowing means; and means for activating the blowing means such that the blowing means operates according to the operating characteristic.

In Example 109, the subject matter of Example 108 optionally includes wherein the operating characteristic includes a fan speed.

In Example 110, the subject matter of Example 108 optionally includes means for generating input signals, the input signals including commands for operating the mobile device; and means for transmitting the signals to the mobile device.

In Example 111, the subject matter of any one or more of Examples 108-110 optionally include means for docking the mobile device to the mobile terminal.

In Example 112, the subject matter of any one or more of Examples 108-110 optionally include means for illuminating an outline on a surface, the outline showing a placement of the mobile device on the surface.

Example 113 is a method of controlling a mobile device with a mobile terminal, the method comprising: receiving a signal from the mobile device, the signal including data describing an operating characteristic of a fan located within the mobile terminal; and activating the fan such that the fan operates according to the operating characteristic.

In Example 114, the subject matter of Example 113 optionally includes wherein the operating characteristic includes a fan speed.

In Example 115, the subject matter of any one or more of Examples 113-114 optionally include generating input signals, the input signals including commands for operating the mobile device; and transmitting the signals to the mobile device.

In Example 116, the subject matter of any one or more of Examples 113-115 optionally include docking the mobile device to the mobile terminal.

In Example 117, the subject matter of any one or more of Examples 113-115 optionally include projecting an outline on a surface, the outline showing a placement of the mobile device on the surface.

Example 118 is at least one computer-readable medium comprising instructions to perform any of the methods of Examples 113-117.

Example 119 is an apparatus comprising means for performing any of the methods of Examples 113-117.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A mobile device located proximate a mobile terminal and controlled by the mobile terminal, the mobile device comprising:
   a processor; and
   a memory storing instructions that, when executed by the processor, cause the processor to:
      determine a mode of operation of the mobile device,
      determine a thermal profile for the mode of operation of the mobile device, the thermal profile defining an acceptable skin temperature range of the mobile device, and
      implement a power profile to achieve the thermal profile, the power profile defining a voltage or current to achieve the thermal profile.

2. The mobile device of claim 1, wherein determining the thermal profile includes selecting the thermal profile from a plurality of thermal profiles.

3. The mobile device of claim 1, wherein the instructions further cause the processor to receive thermal data from a plurality of sensors located within the mobile device.

4. The mobile device of claim 3, wherein the thermal data includes a skin temperature of the mobile device.

5. The mobile device of claim 3, wherein the thermal data includes a processor temperature.

6. The mobile device of claim 1, wherein the power profile includes data defining an operating voltage for the processor.

7. The mobile device of claim 1, wherein the power profile includes data defining an operating current for the processor.

8. A method of controlling a mobile device, the method comprising:
   determining, by the mobile device, a mode of operation of the mobile device;
   determining, by the mobile device, a thermal profile for the mode of operation of the mobile device, the thermal profile defining an acceptable skin temperature range of the mobile device; and
   implementing, by the mobile device, a power profile to achieve the thermal profile, the power profile defining a voltage or current to achieve the thermal profile.

9. The method of claim 8, wherein determining the thermal profile includes selecting the thermal profile from a plurality of thermal profiles.

10. The method of claim 8, wherein determining the power profile includes selecting the power profile from a plurality of power profiles.

11. The method of claim 8, further comprising sensing, using a plurality of sensors within the mobile device, thermal data from the mobile device.

12. The method of claim 11, wherein the thermal data includes a skin temperature of the mobile device.

13. The method of claim 11, wherein the thermal data includes a processor temperature.

14. The method of claim 8, wherein the power profile includes data defining an operating voltage or an operating current for the mobile device.

15. At least one non-transitory computer-readable medium comprising instructions that, when executed by a processor, cause the processor to:
   receive a pairing signal from a mobile terminal;
   determine a mode of operation of a mobile device;
   determine a thermal profile for the mode of operation of the mobile device, the thermal profile defining an acceptable skin temperature range of the mobile device; and
   implement a power profile to achieve the thermal profile, the power profile defining a voltage or current to achieve the thermal profile.

16. The non-transitory computer-readable medium of claim 15, wherein determining the thermal profile includes selecting the thermal profile from a plurality of thermal profiles.

17. The non-transitory computer-readable medium of claim 15, wherein the instructions further cause the processor to receive thermal data from a plurality of sensors located within the mobile device.

18. The non-transitory computer-readable medium of claim 17, wherein the thermal data includes a skin temperature of the mobile device.

19. The non-transitory computer-readable medium of claim 17, wherein the thermal data includes a processor temperature.

20. The non-transitory computer-readable medium of claim 15, wherein the power profile includes data defining an operating voltage or operating current for the mobile device.

21. A mobile device controlled by a mobile terminal, the mobile device located proximate the mobile terminal, the mobile device comprising:
   means for pairing the mobile device with the mobile terminal;
   means for determining a mode of operation of the mobile device,
   means for determining a thermal profile for the mode of operation of the mobile device, the thermal profile defining an acceptable skin temperature range of the mobile device, and
   means for determining a power profile to achieve the thermal profile, the power profile defining a voltage or current to achieve the thermal profile.

22. The mobile device of claim 21, further comprising means for transmitting the power profile to the mobile terminal.

23. The mobile device of claim 21, wherein the means for determining the thermal profile includes:
   means for selecting the thermal profile from a plurality of thermal profiles; and means for selecting the power profile from a plurality of power profiles.

24. The mobile device of claim 21, further comprising means for receiving thermal data of the mobile device.

25. The mobile device of claim 21, further comprising means for transmitting a signal to the mobile terminal, the signal including fan data describing an operating parameter of a fan of the mobile terminal.

\* \* \* \* \*

UNITED STATES PATENT AND TRADEMARK OFFICE
CERTIFICATE OF CORRECTION

| | | |
|---|---|---|
| PATENT NO. | : 10,412,560 B2 | Page 1 of 1 |
| APPLICATION NO. | : 15/280986 | |
| DATED | : September 10, 2019 | |
| INVENTOR(S) | : Miele et al. | |

It is certified that error appears in the above-identified patent and that said Letters Patent is hereby corrected as shown below:

On the Title Page

In item (71), in "Applicants", in Column 1, Lines 1-13, delete "Ralph V. Miele, Hillsboro, OR (US); Eduardo Escamilla, Round Rock, TX (US); James Utz, Austin, TX (US); James M. Yoder, Beaverton, OR (US); Tongyan Zhai, Buffalo Grove, IL (US); Baomin Liu, Austin, TX (US); Meenakshi Gupta, Portland, OR (US); Brian R Peil, Portland, OR (US); Venkat R Gaurav, Beaverton, OR (US); Drew G Damm, Hillsboro, OR (US); Andrew Larson, Hillsboro, OR (US); Ricky O Branner, Sherwood, OR (US)" and insert --Intel Corporation, Santa Clara, CA (US)-- therefor Signed and Sealed this
Fourteenth Day of November, 2023

Katherine Kelly Vidal
*Director of the United States Patent and Trademark Office*